(12) United States Patent
Makuta et al.

(10) Patent No.: US 7,387,513 B2
(45) Date of Patent: Jun. 17, 2008

(54) RIDING SIMULATION DEVICE

(75) Inventors: Yohei Makuta, Wako (JP); Yukio Miyamaru, Wako (JP); Futoshi Miyakawa, Wako (JP); Sadanao Ichimi, Wako (JP); Kyohei Ueda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 10/544,853

(22) PCT Filed: Feb. 12, 2004

(86) PCT No.: PCT/JP2004/001474

§ 371 (c)(1),
(2), (4) Date: Aug. 5, 2005

(87) PCT Pub. No.: WO2004/072927

PCT Pub. Date: Aug. 26, 2004

(65) Prior Publication Data

US 2006/0136826 A1    Jun. 22, 2006

(30) Foreign Application Priority Data

Feb. 14, 2003 (JP) .............................. 2003-036173
Feb. 14, 2003 (JP) .............................. 2003-037407
Oct. 21, 2003 (JP) .............................. 2003-361146

(51) Int. Cl.
   *G09B 19/16*    (2006.01)
(52) U.S. Cl. ....................................................... 434/61
(58) Field of Classification Search .................. 434/29, 434/61, 69; 463/6, 36
See application file for complete search history.

(56) References Cited

U.S. PATENT DOCUMENTS 3,526,042 A * 9/1970 Nelson ......................... 434/61
4,978,300 A * 12/1990 Letovsky et al. ............. 434/61
5,209,662 A * 5/1993 Fujita et al. .................. 434/61

(Continued)

FOREIGN PATENT DOCUMENTS

JP    08-150263    6/1996

(Continued)

*Primary Examiner*—Kurt Fernstrom
(74) *Attorney, Agent, or Firm*—Carrier, Blackman & Associates, P.C.; Joseph P. Carrier; William D. Blackman

(57) ABSTRACT

A riding simulation device allowing a rider to pseudoexperience the running state of a motorcycle, more specifically, to pseudoexperience an operating feeling similar to an actual braking, to be able to switch the operating feeling of an operating lever according to the types of transmissions, and to pseudoexperience roll feeling when the motorcycle is turned by tilting a motorcycle body in running when the device is installed on a pedestal member, comprising an elastic member pressingly deformed by the contact part of a stopper mechanism brought into contact with a rotating member rotated by the operation of a brake lever and a switching mechanism switching between the second stopper member of the stopper mechanism brought into contact with a rotating member rotated by the operation of the operating lever and the first stopper member thereof brought into contact with the rotating member through the elastic member. The axis of a shaft part in which a handle mechanism is installed is set so as to be tilted in the range of the tilt angle of 45 to 60 DEG from a vertical plane to an operator side.

21 Claims, 17 Drawing Sheets

U.S. PATENT DOCUMENTS

| | | | |
|---|---|---|---|
| 6,200,138 B1 * | 3/2001 | Ando et al. | 434/61 |
| 6,210,165 B1 * | 4/2001 | Sugimori | 434/61 |
| 6,251,015 B1 * | 6/2001 | Caprai | 463/36 |
| 6,471,586 B1 * | 10/2002 | Aiki et al. | 463/6 |
| 2003/0211446 A1 * | 11/2003 | Harashima et al. | 434/61 |
| 2004/0076929 A1 * | 4/2004 | Gerkey | 434/61 |

FOREIGN PATENT DOCUMENTS

| | | |
|---|---|---|
| JP | 08-263160 | 10/1996 |
| JP | 09-081024 | 3/1997 |
| JP | 10-293526 | 11/1998 |
| JP | 11-174943 | 7/1999 |
| JP | 2002-113264 | 4/2002 |
| JP | 2002-311811 | 10/2002 |

\* cited by examiner

RIDING SIMULATION DEVICE

CROSS-REFERENCE TO RELATED APPLICATIONS

The present application is the U.S. National phase of PCT International Application No. PCT/JP2004/001474, filed 12 Feb. 2004. The referenced PCT Application claims priority from each of the following priority documents: Japanese Patent Application No. 2003-36173, filed on 14 Feb. 2003; Japanese Patent Application No. 2003-37407, filed on 14 Feb. 2003; and Japanese Patent Application No. 2003-361146, filed on 21 Oct. 2003. The entire disclosure of the parent PCT Application, as well as the entire disclosure each of the above-referenced Japanese priority documents is hereby incorporated by reference.

BACKGROUND OF THE INVENTION

1. Field of the Invention

The present invention relates to a riding simulation device for displaying a traveling background as an image on a display so as to give a simulated experience of riding on a motorcycle based on operations by an operator.

2. Description of the Prior Art

In the related art, riding simulation devices where various traveling conditions are displayed on a display as a result of an operator carrying out various operations so that an operator has a simulated experience of riding on a motorcycle have been adopted for use as games or for use in the teaching of how to ride a motorcycle, etc.

For example, a riding simulation device for use in a game has a handle shaft extending upwards from a base member formed with a substantially flat lower surface, and a handle provided at the top of the handle shaft in directions to the left and right.

Further, a rotatable right lever as a brake lever for the front wheel, and a left lever for performing a clutch switching operation are provided, and an operation of accelerating the motorcycle displayed on the display is carried out using a rotatable right grip as an accelerator provided at a right end of the handle.

The riding simulation device is placed on a flat surface such as a floor, etc., and the player can then experience a simulation of operating the motorcycle displayed on the display for game use. The riding simulation device is played by gripping the handle, rotating the handle about the handle shaft according to the traveling conditions, rotating the right grip as necessary to accelerate the motorcycle displayed on the display, reducing speed by operating the left and right levers, and performing gear change operations (for example, refer to Japanese Laid-open Patent Publication No. 2002-113264).

However, with an actual motorcycle, when a driver is operating a brake lever provided on the handle to decelerate the motorcycle, the driver is required to gradually increase the operation force for gripping the brake lever by fixed amounts in a proportional manner from the start of gripping until a prescribed amount of force is reached, and then dramatically increase the operation force at a time where the operating force exceeds the prescribed amount.

In other words, after the operating force with which the driver grips the brake lever reaches the prescribed amount, the reaction force exerted upon the driver from the brake lever becomes large, and the operating force for gripping the brake lever is such that the change in operation amount is slight even if operation force is made strong at the same proportion.

However, in the riding simulation device of Japanese Laid-open Patent Publication No. 2002-113264, the right lever is provided in such a manner that only spring force of a spring acts in resistance to rotation of the right lever functioning as a brake lever. The reaction force exerted on the right lever when the motorcycle displayed on the game display is decelerated as a result of gripping of the right lever increases in a linear manner in proportion to the operation force of the right lever.

In other words, the rate of change of the reaction force exerted upon the right lever by spring force of the spring is fixed. Namely, the operating force from when the rider starts to grip the right lever to when the motorcycle stops is normally fixed.

As a result, at the time of gripping the brake lever to reduce speed, the operation feeling of this brake lever of the simulation device is different from the operation feeling in driving an actual motorcycle. Therefore, it is difficult to experience a bodily sensation in a braking state during actual travel.

Further, when the actual motorcycle is traveling, at the time of turning at a curve or intersection, the vehicle will turn a corner in a manner characteristic for that motorcycle as a result of the vehicle body inclining at a prescribed angle in the direction of turning centered about the wheels (in directions to the left and right with respect to a vehicle).

Specifically, when the motorcycle makes a turn traveling at low speed, cornering is carried out by turning the handle in the desired direction to change the steering angle of the front wheel. When the vehicle is turning while traveling at high speed, cornering is carried out by inclining the motorcycle body by a prescribed angle.

In the actual motorcycle, the handle installed to the vehicle body is inclined toward the rider by an inclination angle (caster angle) of typically 25° with respect to a vertical plane, while in a motorcycle such as an American style motorcycle, the maximum inclination angle is approximately 35°. Stability when traveling in a straight line is also improved by installing the handle to the vehicle body with a large inclination angle.

In the riding simulation device of Japanese Laid-open Patent Publication No. 2002-113264, turning is possible by changing the steering angle of a front wheel of a motorcycle displayed on a game display by turning the handle. During this time, the riding simulation device does not tilt according to the traveling state of the motorcycle. In other words, the handle is held by a base member mounted on a floor surface etc. so that even if the handle is rotated, the riding simulation device having the handle does not make a tilting movement.

Further, in the riding simulation device of Japanese Laid-open Patent Publication No. 2002-113264, the axis of the handle shaft supporting the handle is installed to the vehicle body with an inclination angle (caster angle) of approximately 0° with respect to the vertical plane. In other words, the handle shaft is upright, substantially in parallel to the vertical plane.

However, an actual motorcycle has a characteristic where the vehicle body is inclined when turning. Therefore, when the handle shaft is installed at substantially the same angle as an actual motorcycle and turned, the riding simulation device of Japanese Laid-open Patent Publication No. 2002-113264 differs from an actual motorcycle when cornering in that tilting movement does not take place, and a tilting sensation felt when turning while inclining at a curve etc. during actual travel is not obtained.

SUMMARY OF THE INVENTION

A general object of the present invention is to provide a riding simulation device capable of readily providing a simulated experience of a brake operation feeling that is closer to the feeling of an actual motorcycle braking, and a switching operation feeling of operation levers depending on the type of transmission of the motorcycle.

A main object of the present invention is to provide a riding simulation device capable of providing a simulated experience of a tilting sensation felt when the body of a motorcycle is inclined when turning during traveling in the case where the riding simulation device is installed to a base member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

Preferred embodiments of a riding simulation device according to the present invention will be described in detail with reference to drawings.

Figure 1:
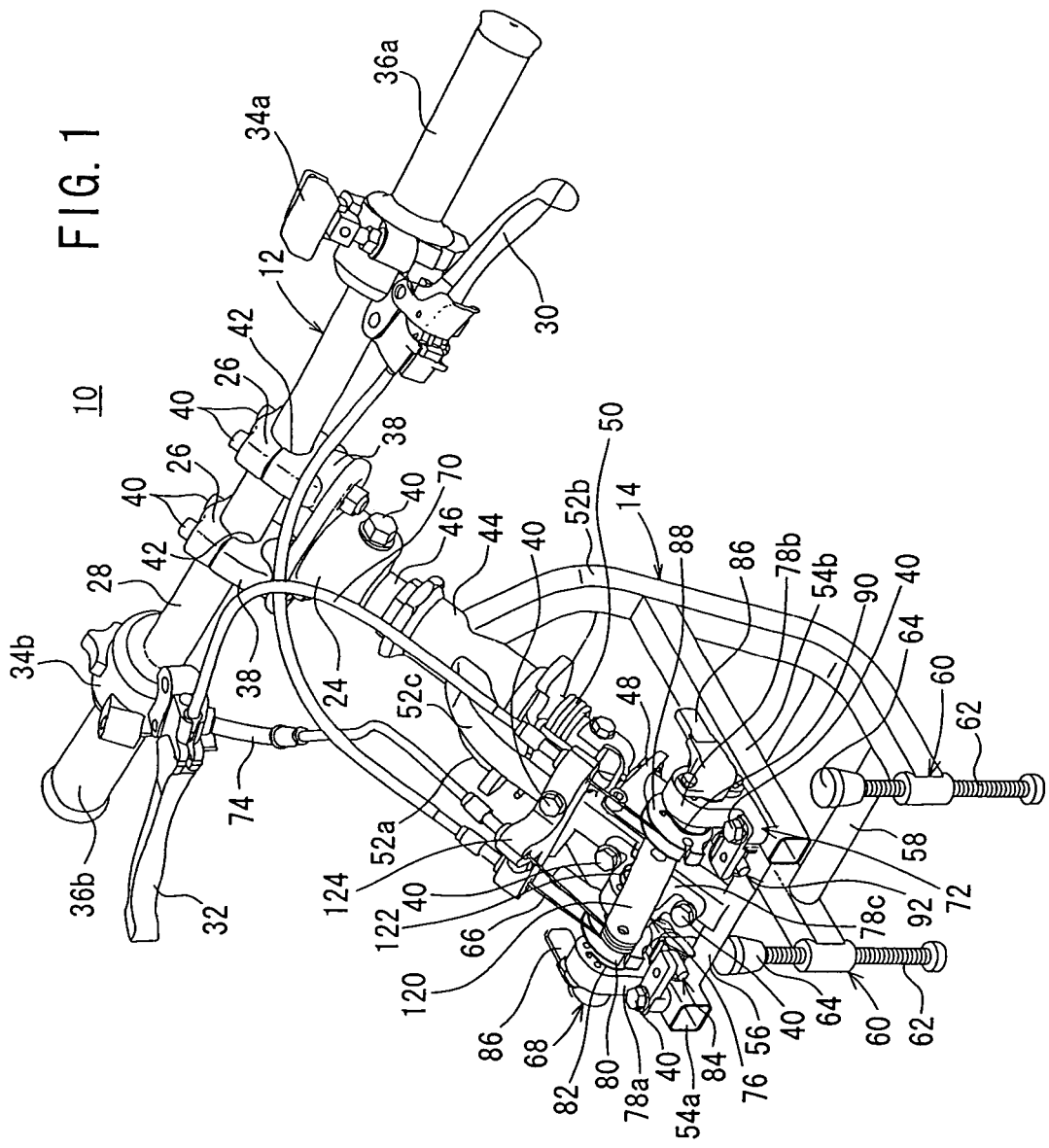
FIG. 1 is a perspective view of a riding simulation device of a first embodiment of the present invention.
Figure 2:
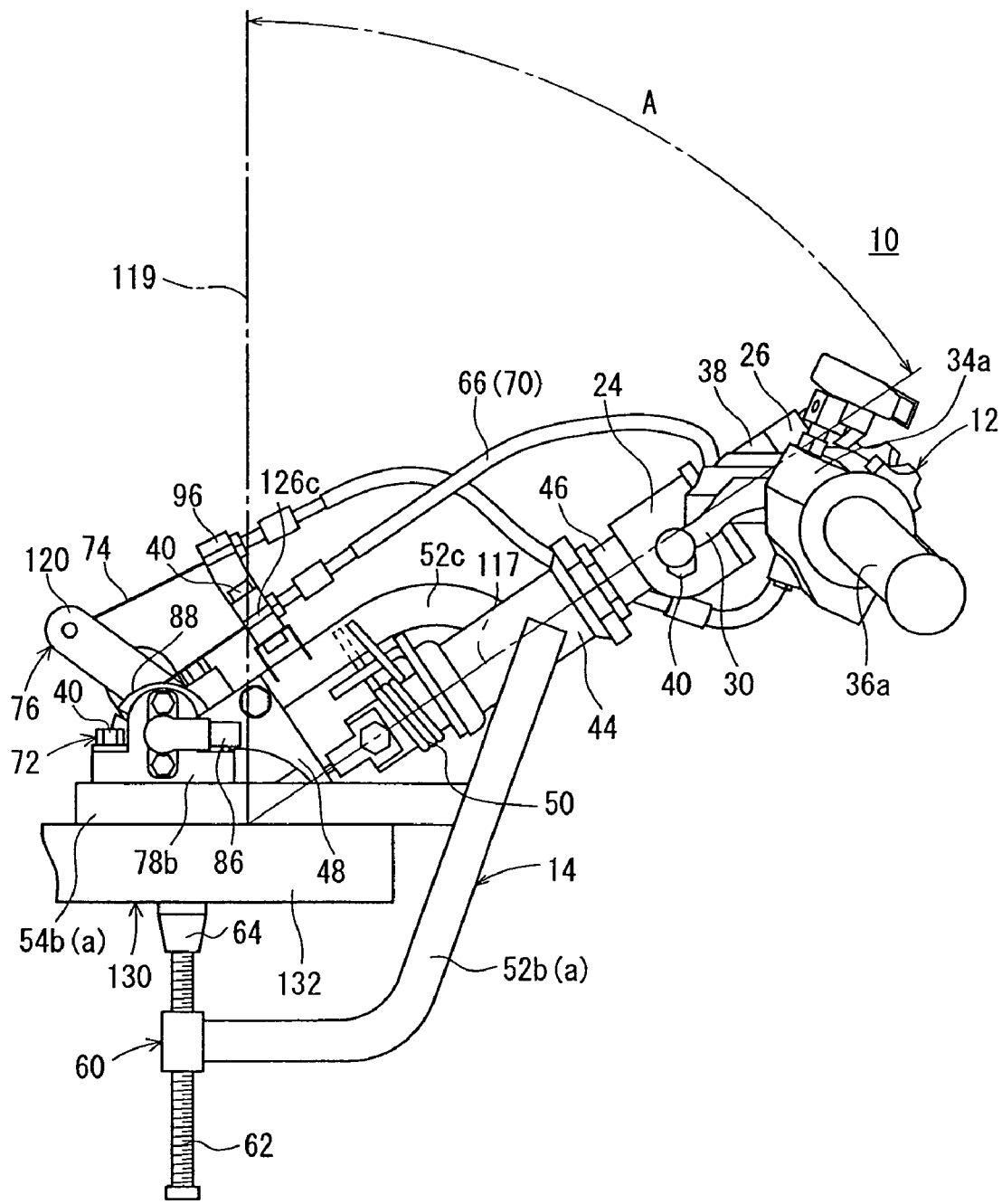
FIG. 2 is a side view of the riding simulation device of FIG. 1.

In FIG. 1 and FIG. 2, reference numeral 10 shows a riding simulation device 10 of a first embodiment of the present invention.

This riding simulation device 10 (hereinafter simply referred to as the simulation device 10) comprises a handle mechanism 12 gripped by an operator 140 (refer to FIG. 3) that is used to steer the front wheel of a motorcycle displayed on a display 128 described later (refer to FIG. 3) and a frame body 14 for supporting the handle mechanism 12 in a freely rotating manner.

The handle mechanism 12 comprises a steering stem 24 formed with a substantially fan-shaped upper end, a steering handle 28 long in length and integrally held at a steering stem 24 via a holder 26, lever connecting units 34a and 34b at which a clutch lever 30 and brake lever 32 are held with respect to the steering handle 28, and a left grip 36a and right grip 36b respectively fitted to the ends of the steering handle 28. The left grip 36a and the right grip 36b are covered with rubber etc.

A substantially fan-shaped fitting surface is formed at an upper end of the steering stem 24, and a pair of fitting flanges 38 are coupled in a substantially parallel manner via bolts 40 so as to project upwards. A semi-circular-shaped recess 42 corresponding to the outer circumference of the steering handle 28 is formed at the fitting flange 38.

Further, the lower end of the steering stem 24 is inserted through a cylindrical section 44 of the frame body 14 so as to be coupled in an integral manner with an upper end of a stem member 46 inserted through a cylindrical section 44 of the frame body 14 via bolts 40. The steering stem 24 is coupled to the upper end of the stem member 46, and the lower end of the stem member 46 that is inserted through the cylindrical section 44 of the frame body 14 is inserted into a hole (not shown) in substantially a central part of the bracket 48 coupled to the frame body 14. Namely, the stem member 46 is axially supported in a freely rotating manner by the cylindrical section 44 and a hole of the bracket 48.

Further, a spring 50 for urging the steering handle 28 coupled to the stem member 46 to always be in a center position is interposed between the stem member 46 and the bracket 48.

The steering handle 28 is formed in a cylindrical shape from a pipe member etc., with both ends bent at respective prescribed angles in a direction to the rear of the simulation device 10.

The left grip 36a is installed at the left end of the steering handle 28. Similarly, the right grip 36b is installed at the right end of the steering handle 28, with the right grip 36b functioning as a throttle grip so that the motorcycle displayed on the display 128 is accelerated when the operator 140 (refer to FIG. 3) rotates the right grip 36b back.

A substantially central part of the steering handle 28 is fitted to the recess 42 of the fitting flange 38 (refer to FIG. 1). A pair of holders 26 are attached to the upper part of the fitting flange 38 such that the steering handle 28 is inserted between the fitting flange and the holders 26, and tightened using bolts 40, so as to be integrally fixed to the steering stem 24.

The lever connecting unit 34a is provided at the left side of the steering handle 28. The clutch lever (operation lever) 30 is then integrally fitted to the front side of the simulation device 10 at the lever connecting unit 34a.

The clutch lever 30 is axially supported in a freely rotating manner with respect to the lever connecting unit 34a, and a clutch of the motorcycle displayed on the display 128 is disengaged when the operator 140 (refer to FIG. 3) grips and rotates the clutch lever 30 in a direction toward the steering handle 28 while changing gear so that a gear change operation is carried out by a gear change pedal (not shown).

The clutch lever 30 is provided only in the case of motorcycles with manual transmissions, with a brake lever being provided in place of the clutch lever 30 in the case of motorcycles with automatic transmissions.

Further, the brake lever 32 is fitted in an integral manner similarly at the front side of the simulation device 10 at the lever connecting unit 34b arranged at the right side of the steering handle 28.

The brake lever 32 is axially supported in a freely rotating manner at the lever connecting unit 34b, and the front wheels of the motorcycle displayed on the display 128 is braked when the operator 140 grips and rotates the brake lever 32 towards the steering handle 28.

Figure 5:
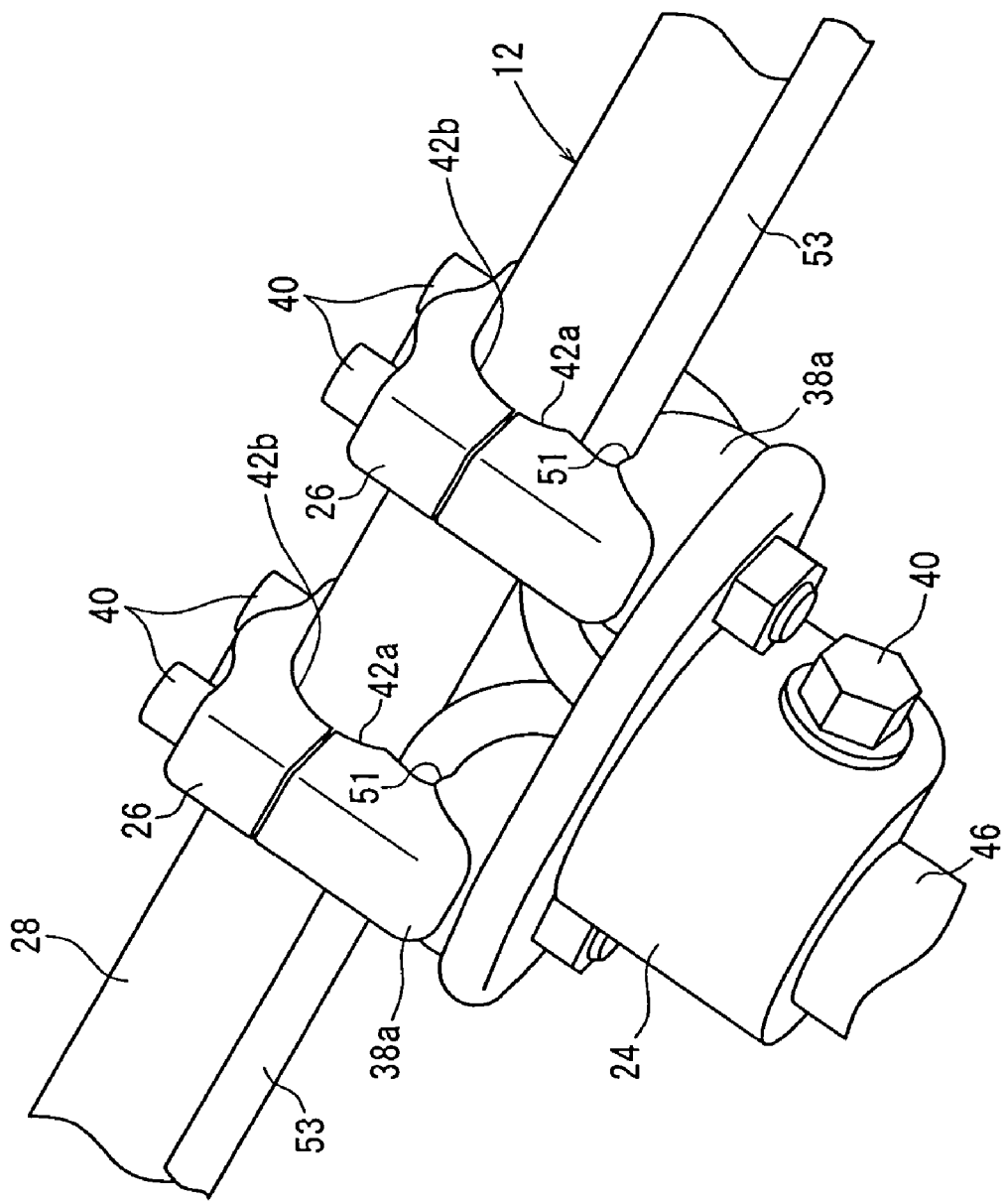
FIG. 5 is an enlarged perspective view showing a state where a harness is fitted between a recess and a holder of a steering stem of FIG. 1.
Figure 6:
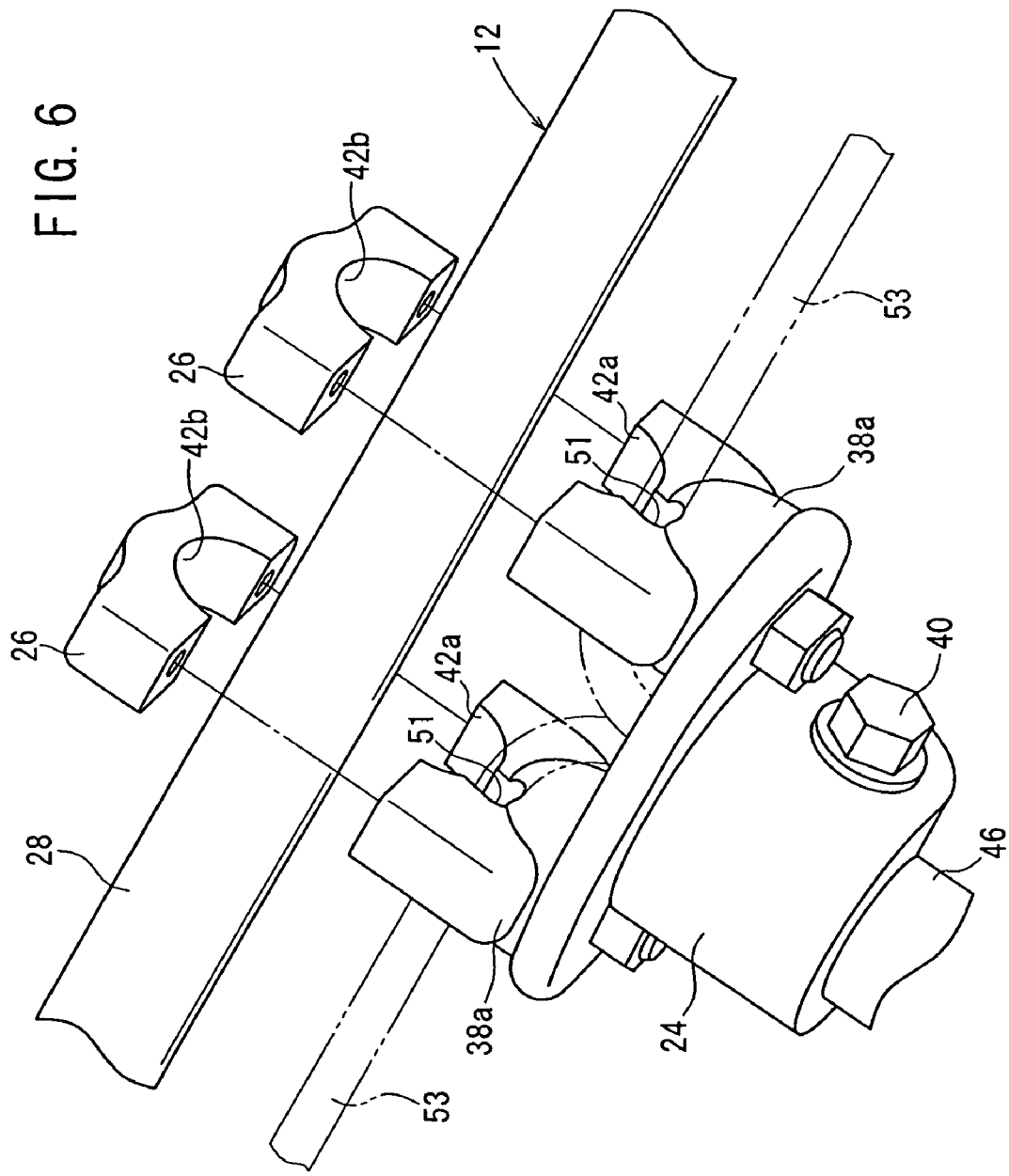
FIG. 6 is an exploded perspective view showing a state where the steering stem, steering handle, and holder in FIG. 5 are disassembled.

Further, as shown in FIG. 5 and FIG. 6, a semi-circular recess 42a corresponding to the outer circumference of the steering handle 28 and a harness installation groove 51 with a substantially semi-circular cross-section formed to a prescribed depth deeper than the recess 42a are formed at the pair of fitting flanges 38a formed at the steering stem 24. A harness 53 connecting the left grip 36a (refer to FIG. 1) and the right grip 36b (refer to FIG. 1) may then be inserted to the harness installation groove 51.

The harness installation groove 51 is positioned on substantially the opposite side (refer to FIG. 5) from the operator 140 (refer to FIG. 3) so that the steering handle 28 is positioned between the operator 140 and the harness installation groove 51 when the steering handle 28 is set in the recess 42a.

For example, a harness 53 outputting a rotation amount of the right grip 36b (refer to FIG. 1) functioning, for example, as a throttle grip, as a signal to detection means (not shown), or a harness 53 connected to a motor so as to create simulated vibrations due to a drive source such as a motor at the right grip in order to impart a feeling of a driving sensation upon the operator 140 is inserted at the harness installation groove 51.

In this way, the harness 53 connected to switches etc. (not shown) from the left grip 36a (refer to FIG. 1) and the right grip 36b (refer to FIG. 1) is inserted into the harness installation groove 51 extending to substantially the center from both ends of the steering handle 28.

After the harnesses 53 are fitted at the harness installation groove 51, substantially the center of the steering handle 28 is fitted to the recess 42a of the fitting flange 38a, and the pair of holders 26 are fitted from the upper part of the fitting flange 38a. By then fastening the bolts 40 with the steering handle 28 engaging with the recess 42b of the holder 26, the steering handle 28 is sandwiched between the fitting flange 38a and the holder 26, and the harness 53 inserted into the harness installation groove 51 is fixed in an integral manner to the steering stem 24.

During this time, the harness 53 is in a position hidden from the field of view of the operator 140 (refer to FIG. 3) by the steering handle 28, i.e. are fixed so as to be positioned in a blind spot as viewed by the operator 140 by the steering handle 28. The operator 140 can therefore maintain a good field of view when operating the simulation device 10.

The harness 53 fitted to the harness installation groove 51 are inserted into the stem member 46 and the cylindrical section 44 via a through-hole (not shown) formed at substantially a central part of the steering stem 24. Because of this, the harness 53 is not exposed to outside and the operator 140 is therefore not hindered when operating the handle mechanism 12 of the simulation device 10.

Further, the plurality of fixing bands for fixing the harnesses 53 to the steering handle 28 required in the related art is no longer required, so that decreases in the number of parts and in costs can be achieved. The harness 53 can also be fixed in an extremely reliable and firm manner by sandwiching the harness 53 between the fitting flange 38a of the steering stem 24 and the holder 26.

The frame body 14 is comprised of three first to third main frames 52a, 52b, 52c coupled spaced at equal angles using a cylindrical section 44 through which the stem member 46 is inserted, a pair of subframes 54a, 54b coupled so as to extend towards the front of the simulation device 10 at a substantially central part of the first and second main frames 52a and 52b, a cross-frame 56 mutually coupling front ends of the subframes 54a, 54b, and a coupling frame 58 linking between the first and second main frames 52a, 52b. The coupling frame 58 is provided substantially parallel with the lower part of the cross-frame 56.

The first to third main frames 52a to 52c are arranged spaced at equal angles taking the cylindrical section 44 as center, and the first and second main frames 52a and 52b arranged substantially symmetrically in directions to the left and right from the cylindrical section 44 are curved so as to extend downwards. Ends of the first and second main frames 52a and 52b extending downwards are substantially flat, and a stopper mechanism 60 for fixing the frame body 14 to a flat table 130 etc. is provided at these ends.

The stopper mechanism 60 is comprised of a pair of fixing bolts 62 provided substantially orthogonally with respect to the first and second main frames 52a and 52b and respectively screwing into the ends of the first and second main frames 52a and 52b, and a retaining member 64 expanding diameter-wise in a direction radially to the outside at an upper end of the fixing bolt 62. The upper surface of the retaining member 64 is substantially flat.

The fixing bolts 62 can then be displaced up and down along an axis direction by screwing the fixing bolts 62 screwed into the first and second main frames 52a and 52b.

The third main frame 52C arranged between the first and second main frames 52a and 52b at the cylindrical section 44 is coupled to the cross-frame 56 bent in a direction going downwards from the cylindrical section 44.

A first detector 68 for detecting an operation amount for the clutch lever 30 is arranged at the upper surface of the subframe 54a and operates in unison with the clutch lever 30 via a clutch wire 66 and a second detector 72 for detecting an amount of operation of the brake lever 32 is arranged at the upper surface of the other subframe 54b and operates in unison with the brake lever 32 via the brake wire 70.

Further, a throttle opening amount detector 76 for detecting extent of opening (amount of rotation) of the right grip 36b fitted to the steering handle 28 via a throttle wire 74 is provided at the upper surface of the third main frame 52c coupled to the cross-frame 56.

Figure 4:
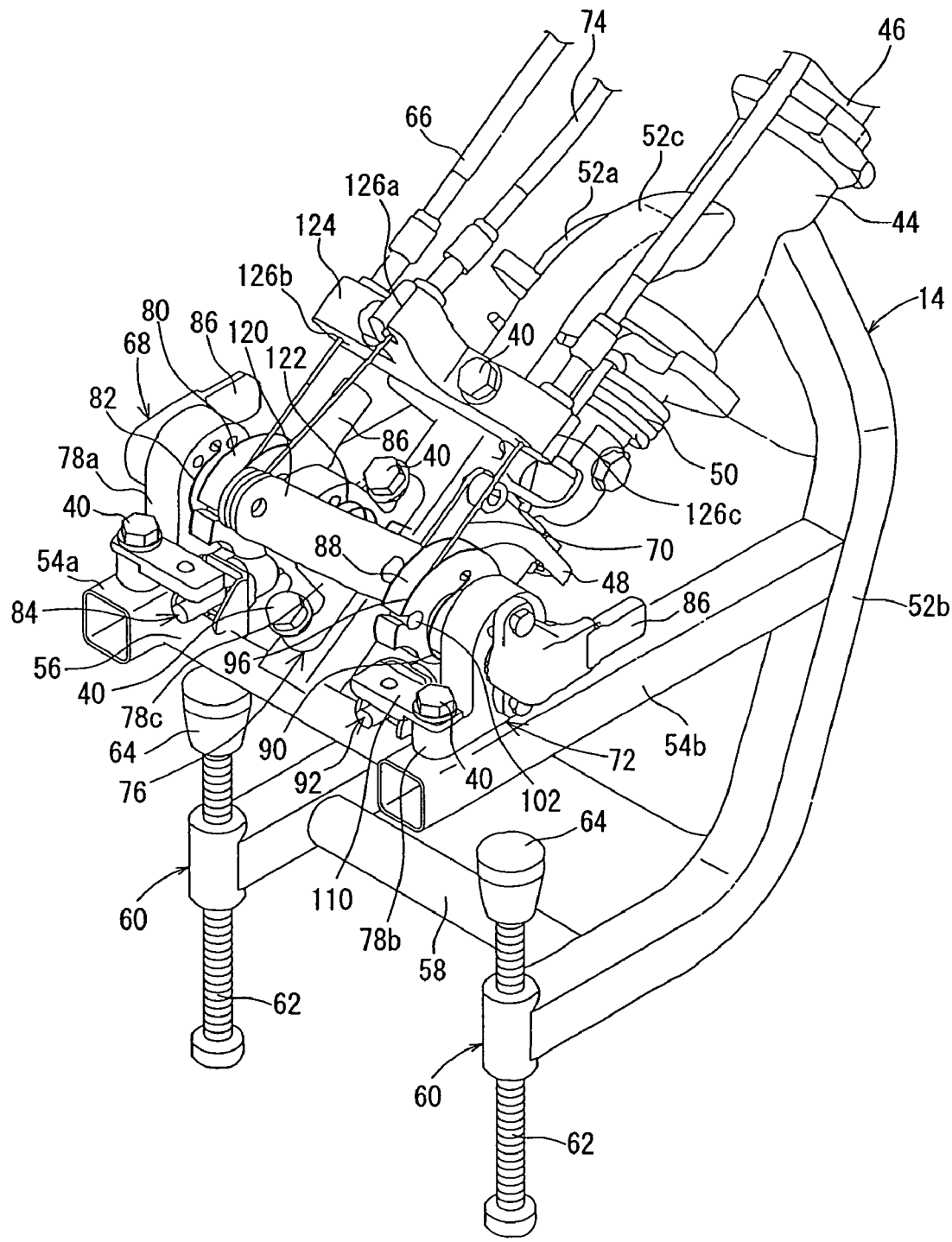
FIG. 4 is an enlarged perspective view of the vicinity of first and second detectors.

As shown in FIG. 4, this first detector 68 is comprised of a detecting body 78a fixed to the subframe 54a via bolts 40, a first rotating pulley 80 axially supported in a freely rotating manner with respect to the detecting body 78a, a first return spring 82 interposed between the detecting body 78a and the first rotating pulley 80, and a first stopper 84 for limiting a rotating operation of the first rotating pulley 80.

One end of a clutch wire 66 is connected to the clutch lever 30, and the other end of the clutch wire 66 is connected to the first rotating pulley 80. Spring force of a first return spring 82 urges the clutch wire 66 connected to the first rotating pulley 80 in a tensioning direction towards the front side of the simulation device 10.

A sensor (not shown) for detecting the amount of rotation of the first rotating pulley 80 is built into the inside of the detecting body 78a. The amount of rotation of the first rotating pulley 80 detected by the sensor is outputted to the control device (not shown) as a detection signal via a connector 86 formed at an outer part of the detecting body 78a.

The clutch lever 30 is spaced away from the steering handle 28 as a result of tensioning of the clutch wire 66 connected to the first rotating pulley 80 under the action of spring force of the first return spring 82.

As shown in FIG. 4, the second detector 72 is comprised of a detecting body 78b fixed via a bolt 40 to the subframe 54b similarly to the first detector 68, a second rotating pulley 88 axially supported in a freely rotating manner with respect to the detecting body 78b, a second return spring 90 interposed between the detecting body 78b and the second rotating pulley 88, and a second stopper 92 for limiting the rotating operation of the second rotating pulley 88.

A sensor (not shown) for detecting the amount of rotation of the second rotating pulley 88 is built within the detecting body 78b, and the amount of rotation of the second rotating pulley 88 detected by the sensor is outputted to the control device (not shown) as a detection signal via the connector 86 formed on an outside part of the detecting body 78b.

The brake lever 32 is spaced away from the steering handle 28 as a result of tensioning of the brake wire 70 connected to the second rotating pulley 88 under the action of elastic force of the second return spring 90.

Figure 7:
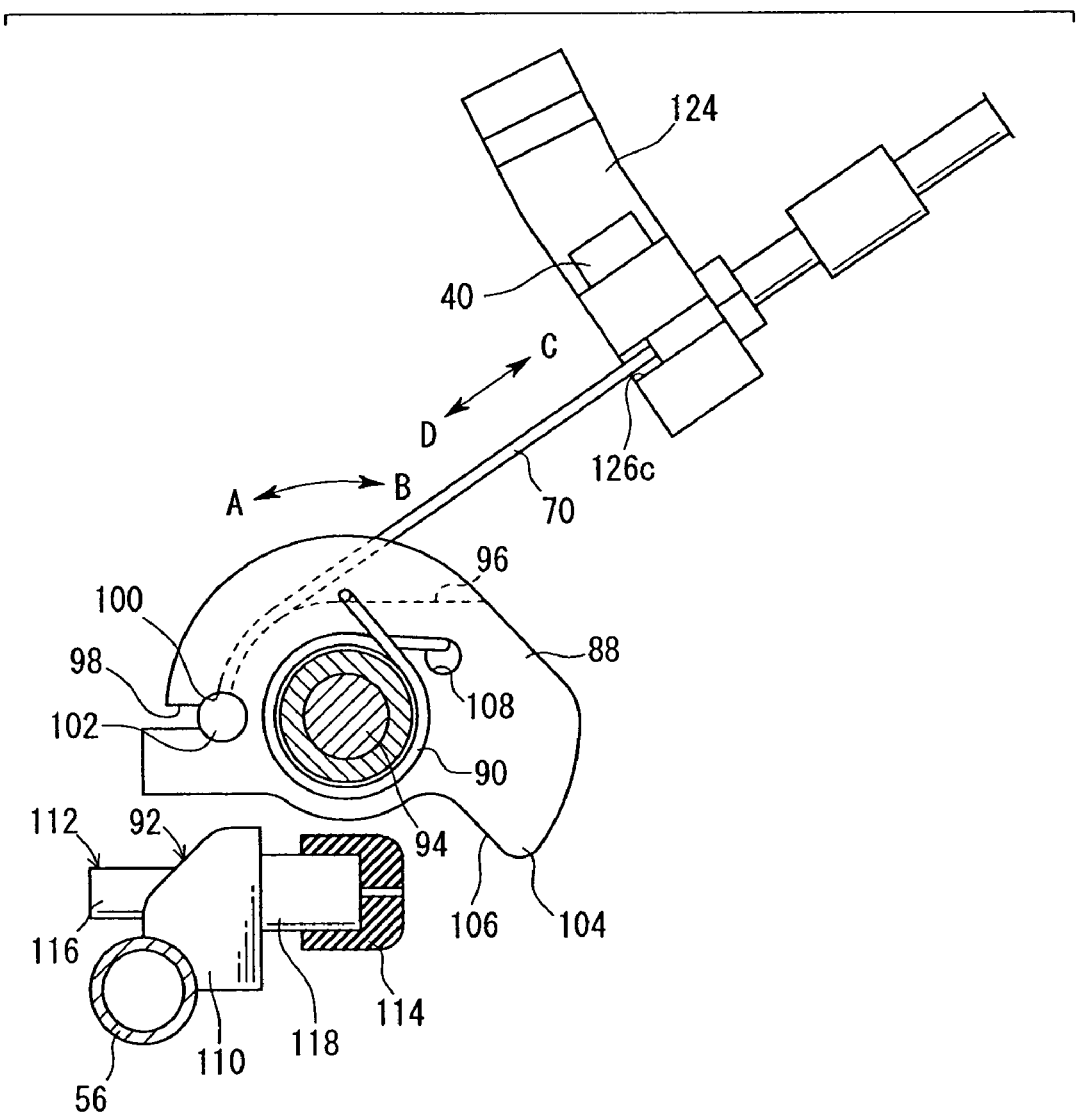
FIG. 7 is an enlarged side view of the vicinity of the second detector of FIG. 2.
Figure 8:
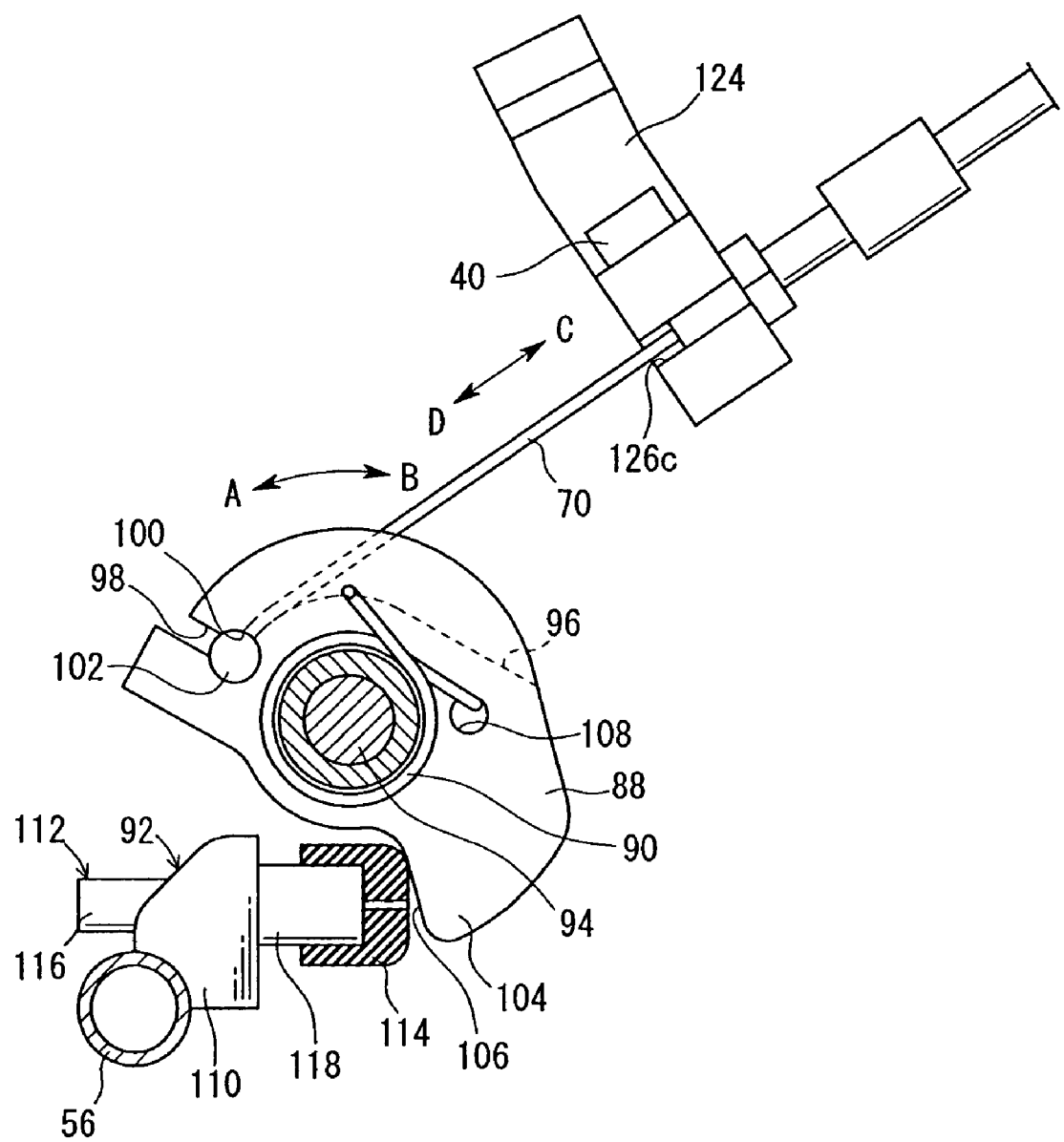
FIG. 8 is a partial enlarged side view illustrating operation showing the state where a second rotating pulley of the second detector of FIG. 7 is rotated by a prescribed angle so as to come into contact with a resilient member.
Figure 9:
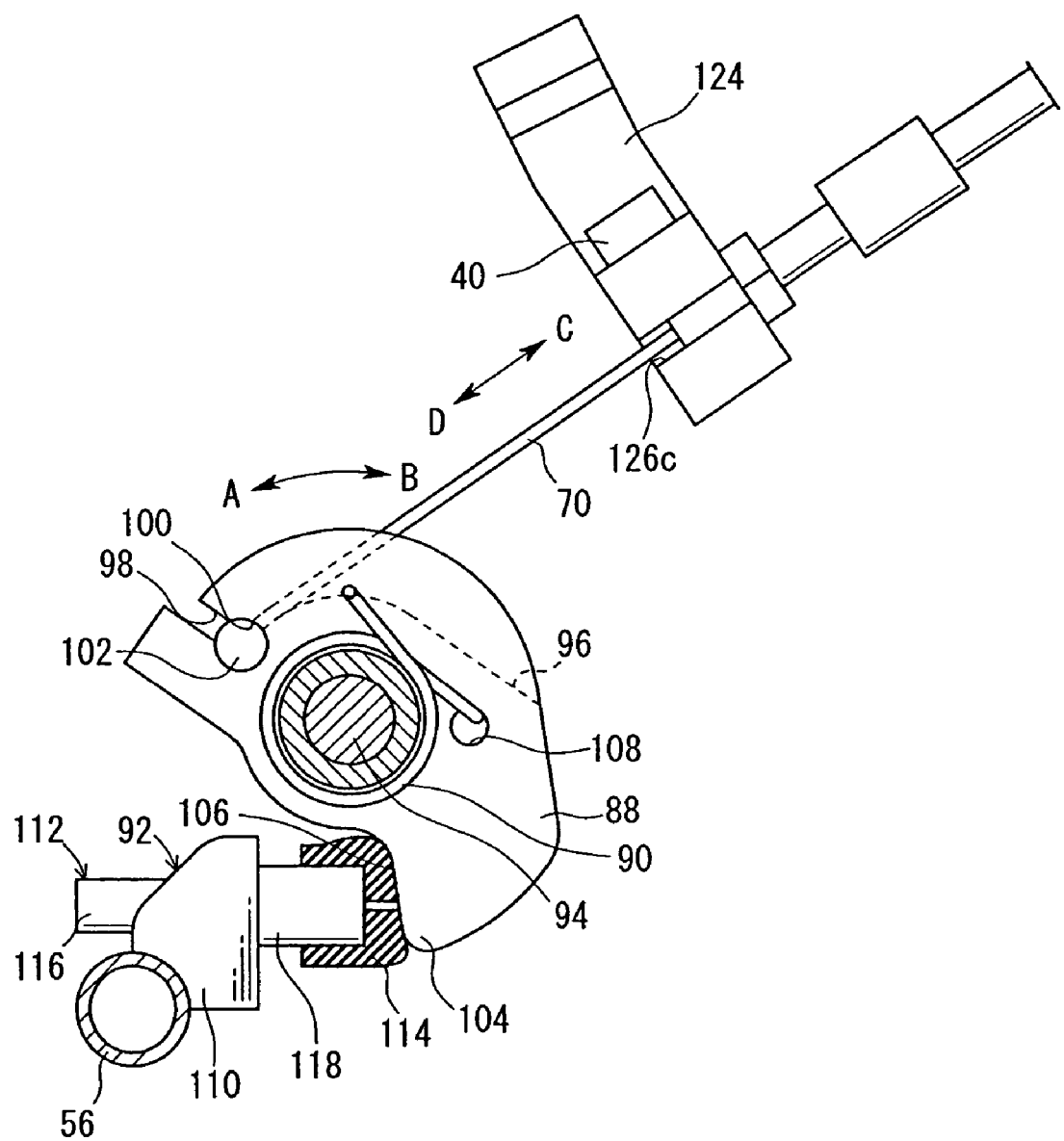
FIG. 9 is a partial enlarged side view showing the state when the second rotating pulley of the second detector of FIG. 8 is further rotated so as to press the resilient member.

As shown in FIG. 7 to FIG. 9, the second rotating pulley 88 is integrally provided with a shaft 94 supported in a freely rotating manner with respect to the detecting body 78b (refer to FIG. 4). A wire threading channel 96 hollowed to a prescribed depth in an inner radial direction from an outer peripheral surface is formed at the outer peripheral surface of the second rotating pulley 88.

Further, a notched channel 98 notched to a prescribed length in an inner radial direction from the outer peripheral surface is formed in the second rotating pulley 88 and a substantially round latch hole 100 is formed at an end of the notched channel 98. A wire latching member 102 coupled to an end of the brake wire 70 is inserted at the latch hole 100.

Specifically, the wire latching member 102 is formed so as to be substantially cylindrical, with a brake wire 70 being coupled to a substantially central part along an axial direction. The wire latching member 102 to which the brake wire 70 is coupled is inserted into the latch hole 100 from the side of the second rotating pulley 88. During this time, the brake wire 70 coupled to the wire latching member 102 is inserted through the notched channel 98 so as to be arranged at a substantially central part of the second rotating pulley 88. The brake wire 70 is installed along the wire threading channel 96 so as to link between the latch hole 100 and the brake lever 32 via a channel 126c of the cable holder 124.

A projection 104 projecting radially outwards is formed at the second rotating pulley 88 and the projection 104 comes into contact with the second stopper 92 under the rotating action of the second rotating pulley 88.

At the projection 104, while the second rotating pulley 88 is rotating, a flat contact surface 106 is formed positioned opposite a large diameter section 118 of the second stopper 92, with the contact surface 106 being formed so as to extend towards the center of the second rotating pulley 88.

The second return spring 90 is installed by being wrapped around the outer periphery of substantially the central part of the second rotating pulley 88, with one end being inserted at a hole 108 formed at a side of the second rotating pulley 88 so as to be latched, and the other end being inserted in a hole (not shown) of the detecting body 78b so as to be latched. Namely, the spring force of the second return spring 90 urges the brake wire 70 latched by the latch hole 100 of the second rotating pulley 88 in a direction of tensioning to the front of the simulation device 10 (direction of arrow A in FIG. 7).

The brake lever 32 is spaced away from the steering handle 28 as a result of tensioning of the brake wire 70 connected to the second rotating pulley 88 under the action of spring force of the second return spring 90.

The second stopper 92 is arranged facing the second rotating pulley 88 at an upper part of the cross-frame 56. This second stopper 92 is comprised of a fitting bracket 110 coupled to the upper part of the cross-frame 56, a columnar pin member 112 fixed to the fitting bracket 110, and a resilient member 114 installed so as to cover the end surface of the pin member 112 facing the second rotating pulley 88.

The pin member 112 comprises a small diameter section 116, and a large diameter section (contact part) 118 expanded diameter-wise in an outward radial direction with respect to the small diameter section 116, with the large diameter section 118 being inserted into an installation hole (not shown) of a fitting bracket 110 so as to be on the side of the second rotating pulley 88. The pin member 112 is then latched in the axial direction as a result of the end surface of the large diameter section 118 of the pin member 112 coming into contact with a side surface of the fitting bracket 110.

The pin member 112 is provided so as to be substantially orthogonal with respect to the shaft 94.

Further, the resilient member 114 is installed at the large diameter section 118 of the pin member 112 so as to cover the vicinity of the end surface. This resilient member 114 is formed of a resilient material such as rubber or sponge etc. or a coil spring, plate spring, or disc spring etc. having spring force.

As shown in FIG. 4, an throttle opening amount detector 76 is such that one end of the rotating plate 120 is axially supported in a freely rotating manner via a detecting body 78c fixed to the third main frame 52c using bolts 40. A spring 122 urging the rotating plate 120 in a direction away from the cylindrical section 44 is interposed between the rotating plate 120 and the detecting body 78c. Further, one end of the throttle wire 74 is connected to the right grip 36b, and the other end of the throttle wire 74 is connected to the other end of the rotating plate 120.

A sensor (not shown) for detecting the amount of rotation of the rotating plate 120 is built within the detecting body 78c, and the amount of rotation of the rotating plate 120 detected by the sensor is outputted to the control device (not shown) as a detection signal via the connector 86 formed on an outside part of the detecting body 78c.

Further, at the upper surface of the third main frame 52c, a cable holder 124 for holding the clutch wire 66, brake wire 70, and throttle wire 74 is installed. The cable holder 124 is spaced by a prescribed distance from the throttle opening amount detector 76. The cable holder 124 is formed substantially T-shaped in cross-section, the throttle wire 74 is inserted through a channel 126a formed substantially at a central part, and a clutch wire 66 connected with the clutch lever 30 is inserted through and held at the channel 126b formed at the right side of the cable holder 124.

Further, a brake wire 70 connecting with the brake lever 32 is inserted through and supported at the channel 126c formed at the left side of the cable holder 124.

The riding simulation device 10 of the first embodiment of the present invention is basically configured as described above, and operation and advantages will be described as follows.

Figure 3:
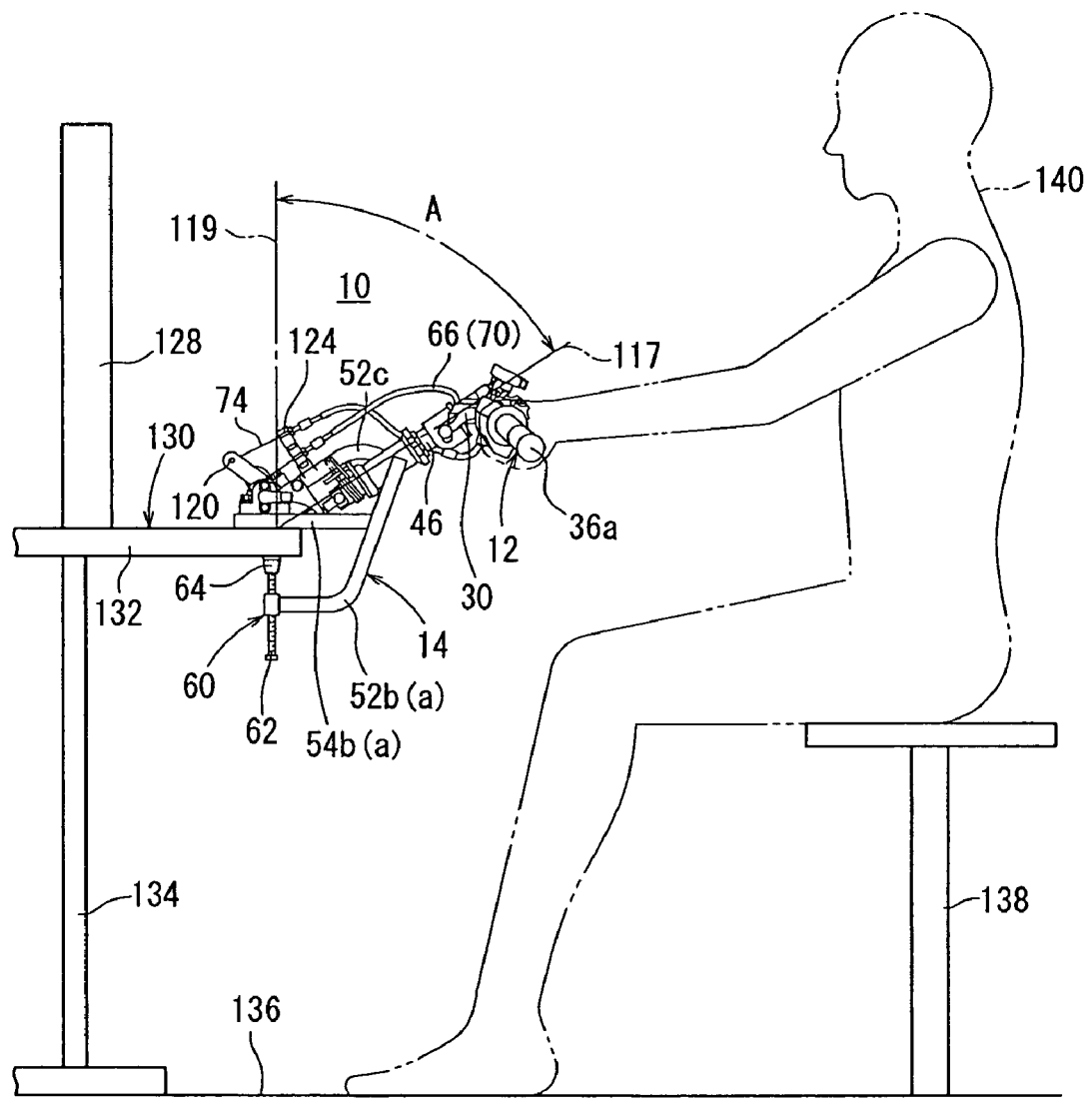
FIG. 3 is a side view showing a condition where the riding simulation device fixed to a table is operated by an operator.

First, as shown in FIG. 3, when the simulation device 10 is fitted to the table 130 etc., lower surfaces of the pair of subframes 54a and 54b of the frame body 14 are mounted so as to come into contact with the upper surface of a plate part 132 of the flat table 130 on which the display 128 is mounted. When the fixing bolt 62 of the stopper mechanism 60 is screwed in so as to be displaced upwards, the upper surface of the retaining member 64 formed at the upper part of the fixing bolt 62 comes into contact with the lower surface of the plate part 132 of the table 130.

As a result, the table 130 can sandwiched by the subframes 54a, 54b and the retaining member 64 of the stopper mechanism 60, and the simulation device 10 is fixed to the table 130 by the subframes 54a, 54b and the stopper mechanism 60 in a straightforward manner. The table 130 is set up on a floor surface 136 etc. using a leg section 134 linked in a substantially perpendicular manner in a direction downwards from this plate part 132.

Further, during this time, as shown in FIG. 2 and FIG. 3, the axis 117 of the stem member 46 of the handle mechanism 12 is inclined by an inclination angle A ranging from 45° to 65° from the vertical plane toward the operator 140.

During this time, in the case where the inclination angle A of the axis 117 of the stem member 46 set to less than 45° (A<45°) with respect to the vertical plane 119, when the motorcycle displayed on the display 128 is traveling at low speed, it is possible to obtain a desirable feeling when turning by turning the handle of the motorcycle displayed on the display 128 but on the other hand, when traveling at high-speed, it is difficult to obtain a feeling of a tilting movement when cornering with the motorcycle body inclined.

Conversely, when the inclination angle A of the axis 117 of the stem member 46 is set in excess of 65° (A>65°) with respect to the vertical plane, when the vehicle displayed on the display 128 is traveling at high-speed, the feeling or tilting movement when cornering with the vehicle inclined is good, but on the other hand, when traveling at low speeds, it is difficult to obtain a sensation of turning by turning of the handle of the motorcycle displayed on the display 128 by rotating the handle mechanism 12.

As a result, by setting the inclination angle A of the axis 117 of the stem member 46 to within a range of 45° to 65°, it is possible to obtain a simulated experience where both the feeling when rotating the handle mechanism 12 so as to turn by turning when moving at low speeds and the tilting sensation when cornering with the vehicle inclined when moving at high speeds are superior.

It is further preferable that the stem member 46 of the handle mechanism 12 is inclined from the vertical plane 119 toward the operator 140 by the inclination angle A ranging from 50° to 60°.

A description is now given of a method of operating the simulation device 10 fitted to the table 130 etc.

First, as shown in FIG. 3, the operator 140 sits on a seat 138 installed to the rear of the simulation device 10, takes hold of the right grip 36b of the steering handle 28 with the right hand, and takes hold of the left grip 36a of the steering handle 28 with the left hand.

Then, the operator 140 operates the right grip 36b functioning as a throttle for the steering handle 28, brake lever 32, and clutch lever 30 so that the extent of opening the throttle 76 due to the right grip 36b, and the extent of operation of the brake lever 32 and clutch lever 30 are outputted to the control device (not shown) as detection signals of the first detector 68 and the second detector 72.

The traveling state of the motorcycle at the simulation device 10 brought about by the control device based on these detection signals can therefore be displayed on the display 128 mounted on the table 130.

A description is now given of the case where the operator 140 then grips the brake lever 32 (refer to FIG. 1) by just a prescribed amount so that the motorcycle displayed on the display 128 reduces speed.

As shown in FIG. 7, before the operator 140 operates the brake lever 32, the second rotating pulley 88 at the second detector 72 is in an initial position state of being latched rotated to the front side (the direction of arrow A) at the simulation device 10 due to the spring force of the second return spring 90.

In order for the motorcycle to reduce speed from the aforementioned initial position, as shown in FIG. 1, as a result of the operator 140 (refer to FIG. 3) gripping and rotating the brake lever 32 of the handle mechanism 12 by a prescribed amount to the side of the steering handle 28, the brake wire 70 linked to the brake lever 32 is tensioned under the rotation action of the brake lever 32.

The brake wire 70 tensioned by the brake lever 32 is tensioned in a direction towards the handle mechanism 12 (the direction of arrow C) via the channel 126c of the cable holder 124. The second rotating pulley 88 coupled to the brake wire 70 via the wire latching member 102 resists the spring force of the second return spring 90 so as to rotate towards the rear side (the direction of arrow B) of the simulation device 10 together with the shaft 94 supported by the detecting body 78b (refer to FIG. 8). When the operator 140 releases the state of gripping the brake lever 32, the second rotating pulley 88 rotates towards the front side (direction of arrow A) of the simulation device 10 due to the spring force of the second return spring 90. Because of this, the brake wire 70 is tensioned in a direction (the direction of arrow D) away from the handle mechanism 12 under the rotating action of the second rotating pulley 88 so that the state of the initial position is returned to.

The amount of displacement of the brake wire 70 tensioned in a direction (direction of arrow C) towards the handle mechanism 12 is increased in proportion to the operation force of gripping the brake lever 32 by the operator 140, and the extent of rotation towards the rear (the direction of arrow B) of the simulation device 10 of the second rotating pulley 88 accompanying this also increases.

As shown in FIG. 8, the projection 104 is rotated in a direction (the direction of arrow B) towards the second stopper 92 under the rotating action of the second rotating pulley 88, and the projection 104 of the second rotating pulley 88 takes on a contact position G (refer to FIG. 10) making contact with the end surface of the resilient member 114.

Figure 10:
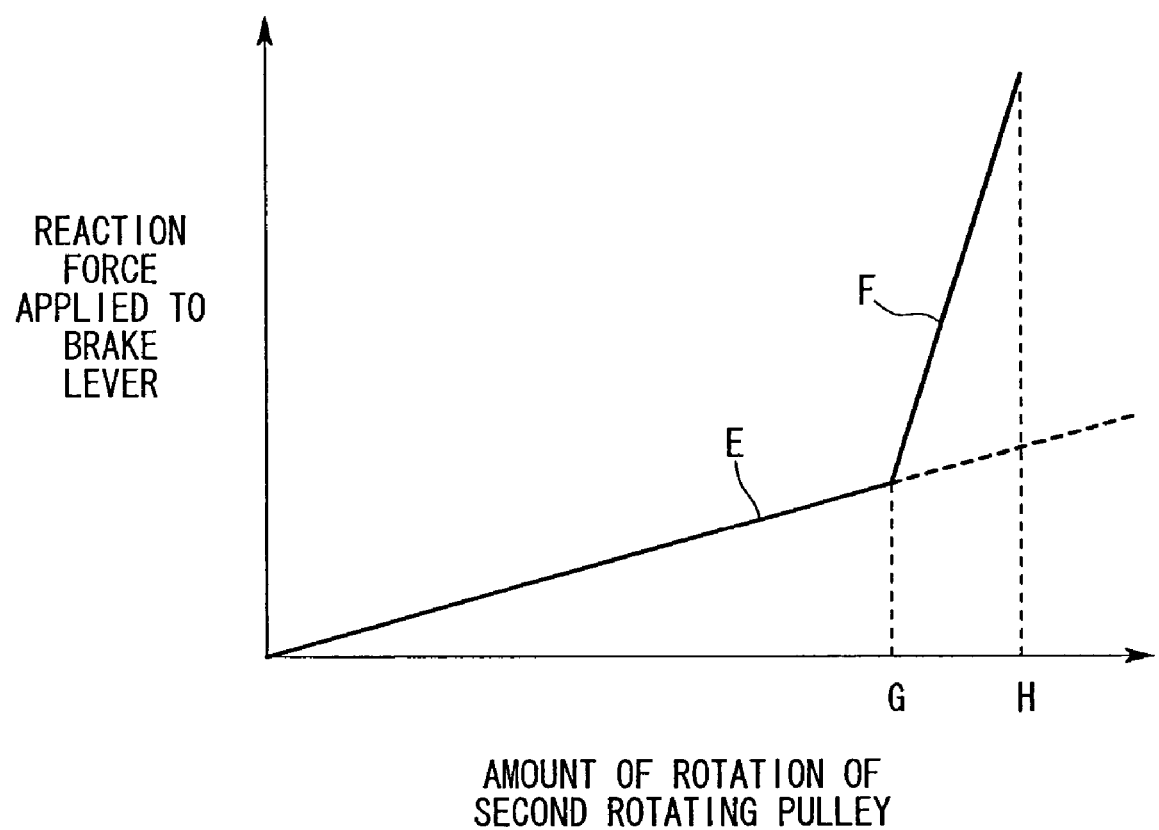
FIG. 10 is a brake characteristic view for while the brake lever of the riding simulation device of FIG. 1 is gripped and rotated.

During this time, because the second rotating pulley 88 rotates in resistance to spring force of the second return spring 90, spring force of the second return spring 90 is applied to the brake lever 32 via the brake wire 70 as reaction force E (refer to FIG. 10). Namely, the operator 140 carries out operations using an operating force that overcomes the spring force when gripping the brake lever 32.

On the other hand, as shown in FIG. 9, as a result of the operator 140 increasing the operating force to the brake lever 32, the brake wire 70 is further tensioned in a direction (the direction of arrow C) towards the handle mechanism 12. The second rotating pulley 88 linked with the brake wire 70 via the wire latching member 102 then resists the spring force of the second return spring 90 so as to be rotated in a direction towards the rear (the direction of arrow B) of the simulation device 10.

The contact surface 106 of the projection 104 of the second rotating pulley 88 presses the resilient member 114 of the second stopper 92 towards the side of the pin member 112 and the vicinity of the contact surface 106 of the projection 104 presses the resilient member 114 so as to deform it while rotating.

Finally, the second rotating pulley 88 rotates up to a position where the resilient member 114 pressed by the projection 104 no longer deforms so as to reach a rotation end position H (refer to FIG. 10) where the rotation stops.

During this time, the second rotating pulley 88 rotates in resistance to the spring force of the second return spring 90 so as to rotate while pressing the resilient member 114 via the projection 104. Because of this, spring force of the second return spring 90 and elastic force from the resilient member 114 urging towards the projection 104 is applied to the brake lever 32 via the brake wire 70 as reaction force F (refer to FIG. 10). Namely, the operator 140 carries out operations using an operating force that overcomes reaction force F constituted by the spring force and the elastic force when gripping the brake lever 32.

As described above, according to the first embodiment of the present invention, it is possible to achieve a simulated experience with a simulation device 10 which is significantly closer to that of the time of riding on an actual motorcycle for both the feeling of rotating the handle mechanism 12 to turn at low speeds and for a tilting movement sensation felt when cornering with a vehicle body at an inclination when traveling at high-speed, by making the fitting angle A with respect to a vertical plane 119 of the handle mechanism 12 within a range of 45° to 65°.

Further, by making the fitting angle A with respect to the vertical plane 119 of the handle mechanism 12 large, it is possible to suppress the height of the handle mechanism 12 on the table 130 which also makes it possible to prevent the view of the operator 140 of the display 128 from becoming obscured by the handle mechanism 12.

A second rotating pulley 88 rotating in response to operation force of the brake lever 32 via the brake lever 32 is provided at second detecting section 72 and a resilient member 114 comprised of resilient material etc. is provided at the end of the second stopper 92 restricting the rotating operation of the second rotating pulley 88. After the second rotating pulley 88 rotates through a prescribed angle under the tensioning operation of the brake wire 70 coupled to the brake lever 32, the projection 104 of the second rotating pulley 88 comes into contact with the resilient member 114 so as to rotate while pressing.

Because of this, prior to making contact with the resilient member 114, the projection 104 of the second rotating pulley 88 rotates in resistance to the spring force of the second return spring 90. The reaction force E applied to the brake lever 32 with respect to the amount of rotation of the second rotating pulley 88 is therefore increased in a smooth and linear manner (refer to FIG. 10).

Further, when the projection 104 of the second rotating pulley 88 comes into contact with the resilient member 114 so that the projection 104 presses and deforms the resilient member 114 while rotating, in addition to the spring force of the second return spring 90, there is also rotation in resistance to the elastic force due to urging of the resilient member 114. The reaction force F applied to the brake lever 32 with respect to the amount of rotation of the second rotating pulley 88 therefore increases dramatically compared with the reaction force E taking the contact position G as a boundary (refer to FIG. 10).

In other words, as shown in FIG. 10, the reaction force E increasing in a linear manner applied to the brake lever 32 changes to a reaction force F from the contact position G where the projection 104 of the second rotating pulley 88 contacts the resilient member 114. The reaction force F increases at a higher rate of increase in comparison with the reaction force E.

Then, as shown in FIG. 9, the reaction force F (refer to FIG. 10) is made up of the spring force and the elastic force applied to the brake lever 32 via the brake wire 70.

The operating force with which the brake lever 32 is gripped and operated needs to be changed to overcome the reaction force F. Namely, the operating force for operating the brake lever 32 increases dramatically from the contact position G where the projection 104 of the second rotating pulley 88 contacts the resilient member 114.

Thus, the reaction force applied to the brake lever 32 while the second rotating pulley 88 is rotating changes from the state where the second rotating pulley 88 resists only the spring force of the second return spring 90 so as to rotate (refer to E in FIG. 10) to the state where in addition to the spring force of the second return spring 90, the resilient member 114 rotates while being pressed by the projection 104 (refer to F in FIG. 10).

As a result, in contrast to the reaction force E applied to the brake lever 32 prior to the projection 104 of the second rotating pulley 88 making contact with the end surface of the resilient member 114, the rate of change with which the reaction force F applied after the projection 104 makes contact with the end surface of the resilient member 114 is substantially large.

Because the reaction force applied to the brake lever 32 can be changed to increase dramatically after the contact position G where the second rotating pulley 88 contacts the resilient member 114, under the action of the reaction force applied by the brake lever 32, operating touch while the operator 140 is operating the brake lever 32 becomes heavy. The operation feeling while operating the brake lever 32 can therefore change in the operation process.

As a result, an operating feeling similar to an operating sensation while gripping a brake lever 32 and reducing speed on an actual motorcycle can be obtained, and a simulated experience with an operation feeling that is extremely close to that of an actual motorcycle can be realized.

Further, the resilient member 114 is provided at the second stopper 92 provided at a position facing the second detector 72 for detecting an operation amount of the brake lever 32, but the present invention is by no means limited in this respect, and may, for example, also be provided at a latch arranged at a position facing a detector for detecting operation amount of a brake pedal operating a foot brake.

Next, a riding simulation device 150 of a second embodiment is shown in FIG. 11 to FIG. 17. The constituent elements that are identical to those shown of the riding simulation device 10 according to the first embodiment are labeled with the same reference numeral, and description thereof will be omitted.

Figure 11:
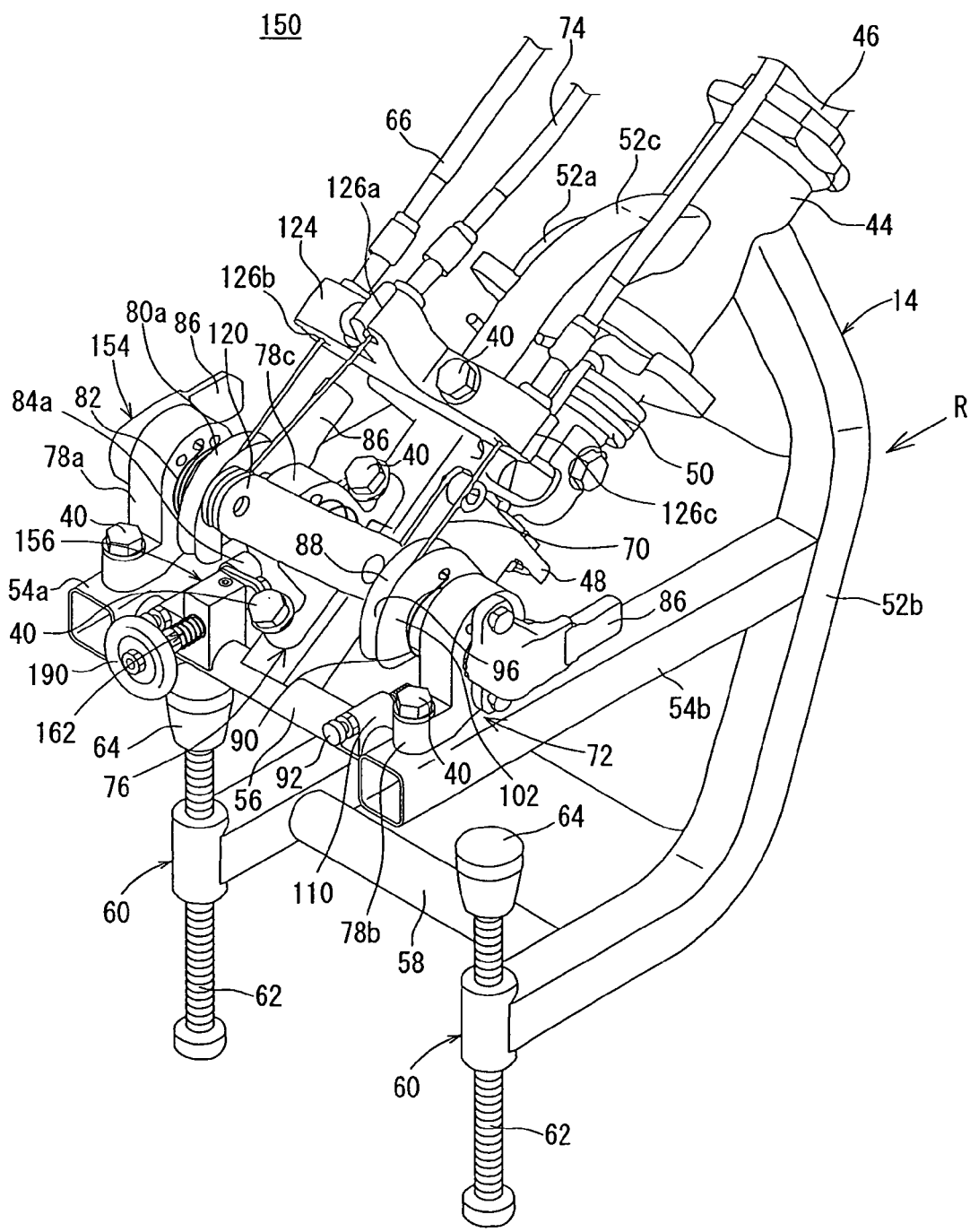
FIG. 11 is an enlarged perspective view of the vicinity of the first and second detectors of the riding simulation device of a second embodiment of the present invention.

As can be seen from FIG. 11, the riding simulation device 150 of the second embodiment differs from the riding simulation device 10 of the first embodiment in that a first detector 154, operating in unison with an operation lever (not shown) during clutch operations (shifting of transmission) or brake operations via the wire 152, for detecting the extent of operation of the operating lever, is provided at an upper surface of one of the subframes 54a, and a switching mechanism 156, capable of switching over to give different operating feels for a clutch operation in the case of a motorcycle with a manual transmission and for a brake operation when the motorcycle has an automatic transmission, is provided at an upper part of the cross-frame 56.

The operation lever functions as a clutch lever in the case of a motorcycle with a manual clutch and as a brake lever in the case of a motorcycle with an automatic transmission.

Figure 12:
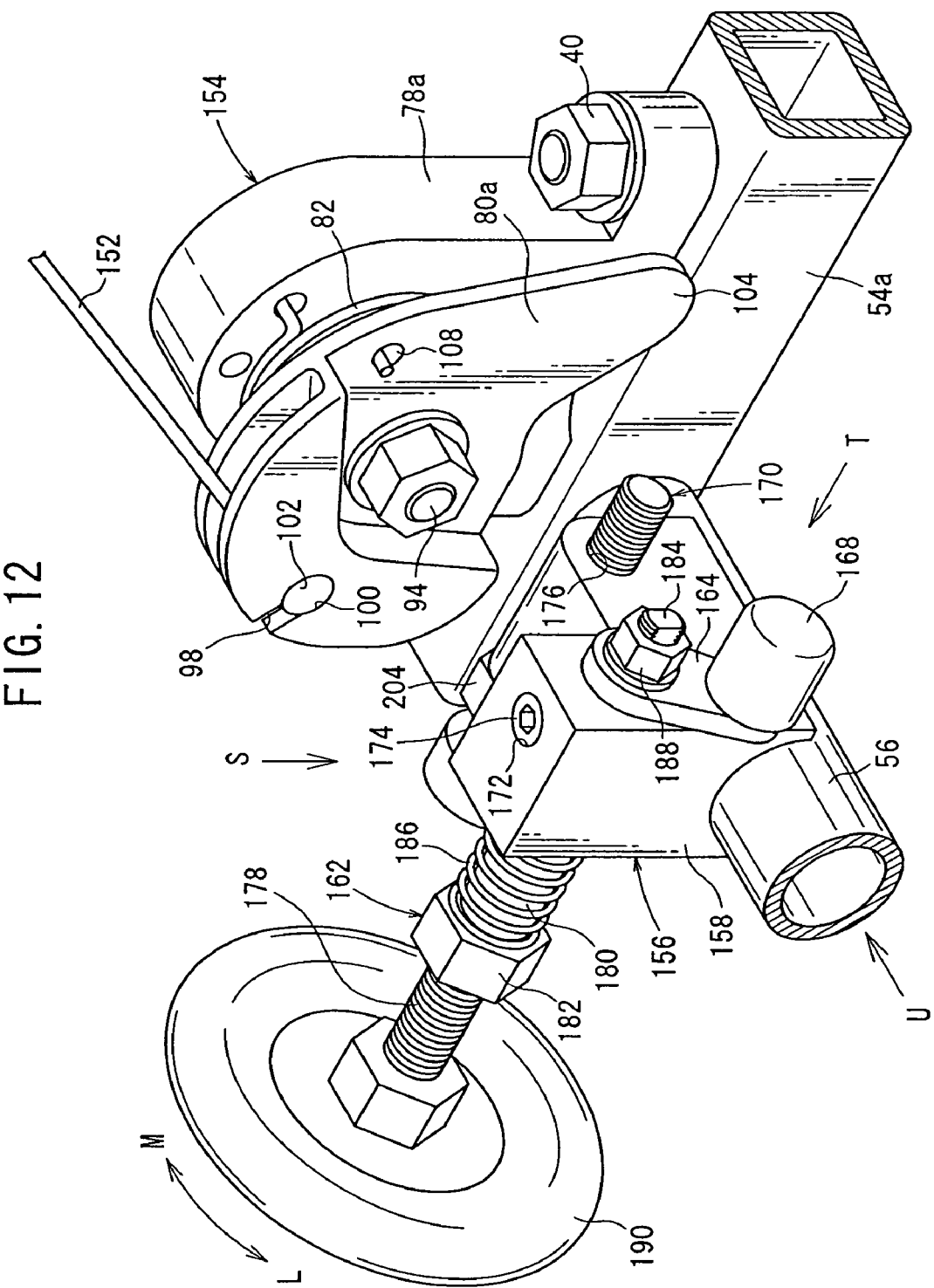
FIG. 12 is an enlarged perspective view of the vicinity of the first detector and the switching mechanism as viewed from a direction indicated by an arrow R in FIG. 11.

As shown in FIG. 12, the switching mechanism 156 is comprised of a body 158 provided integrally at the upper part of the cross-frame 56, an adjustment pin (rotation shaft) 162 (refer to FIG. 13) inserted in a freely rotating manner through an insertion hole 160 (refer to FIG. 14) of the body 158, a plate member 164 with a substantially elliptical cross-section fitted in an integral manner to the adjustment pin (rotation shaft) 162 (refer to FIG. 13), a resilient member 168 installed in such a manner as to cover a rising part 166 (refer to FIG. 14) of the plate member (first stopper member) 164, and a stopper bolt (second stopper member) 170 screwing into the body 158 at a prescribed distance from the adjustment pin 162.

Figure 14:
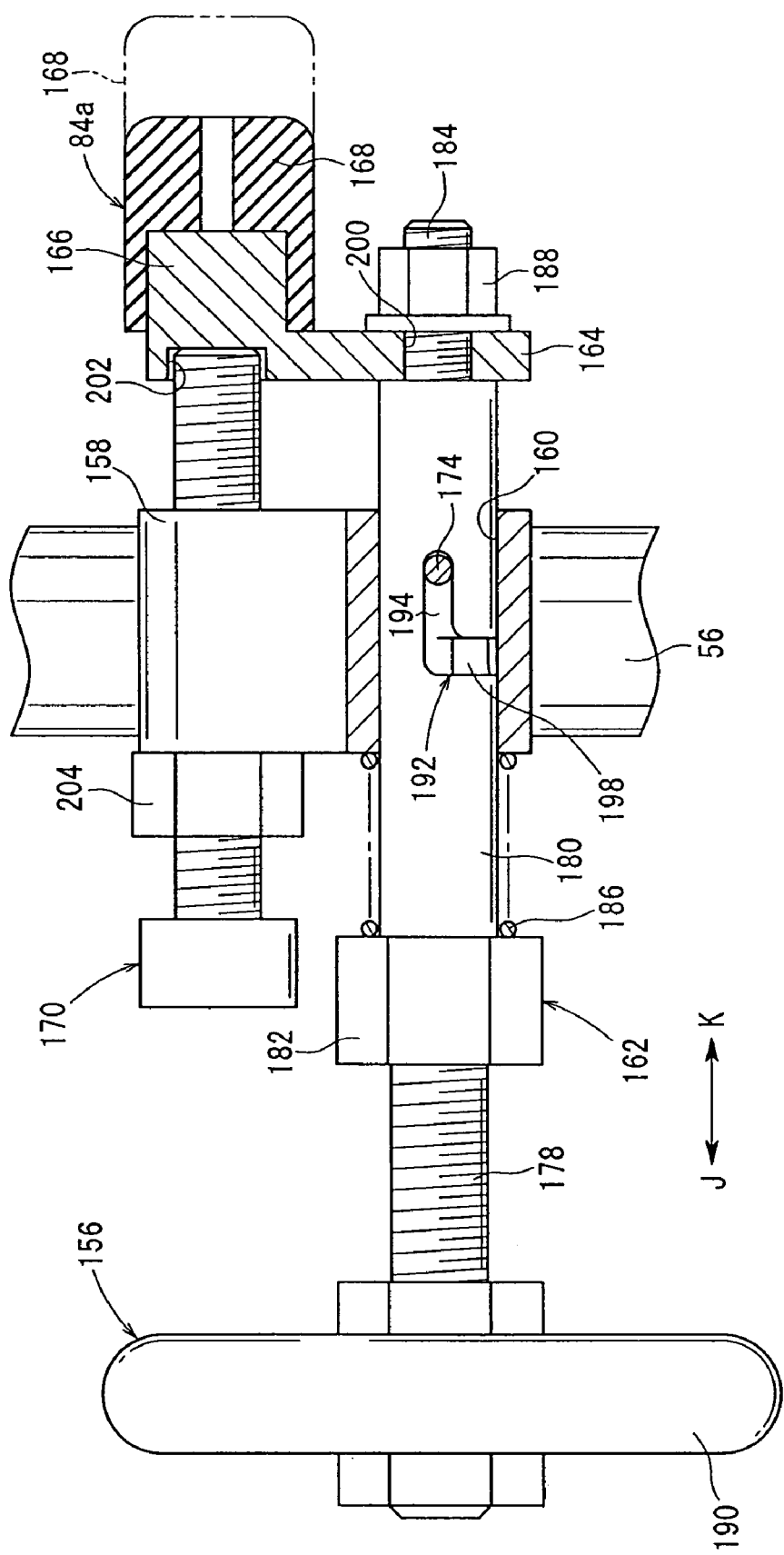
FIG. 14 is a partial cross-sectional plan view as viewed from a direction indicated by an arrow S in FIG. 12, showing a state where a stopper bolt of the switching mechanism and a resilient member of a plate member are positioned on a substantially straight line assuming a motorcycle with an automatic transmission.
Figure 15:
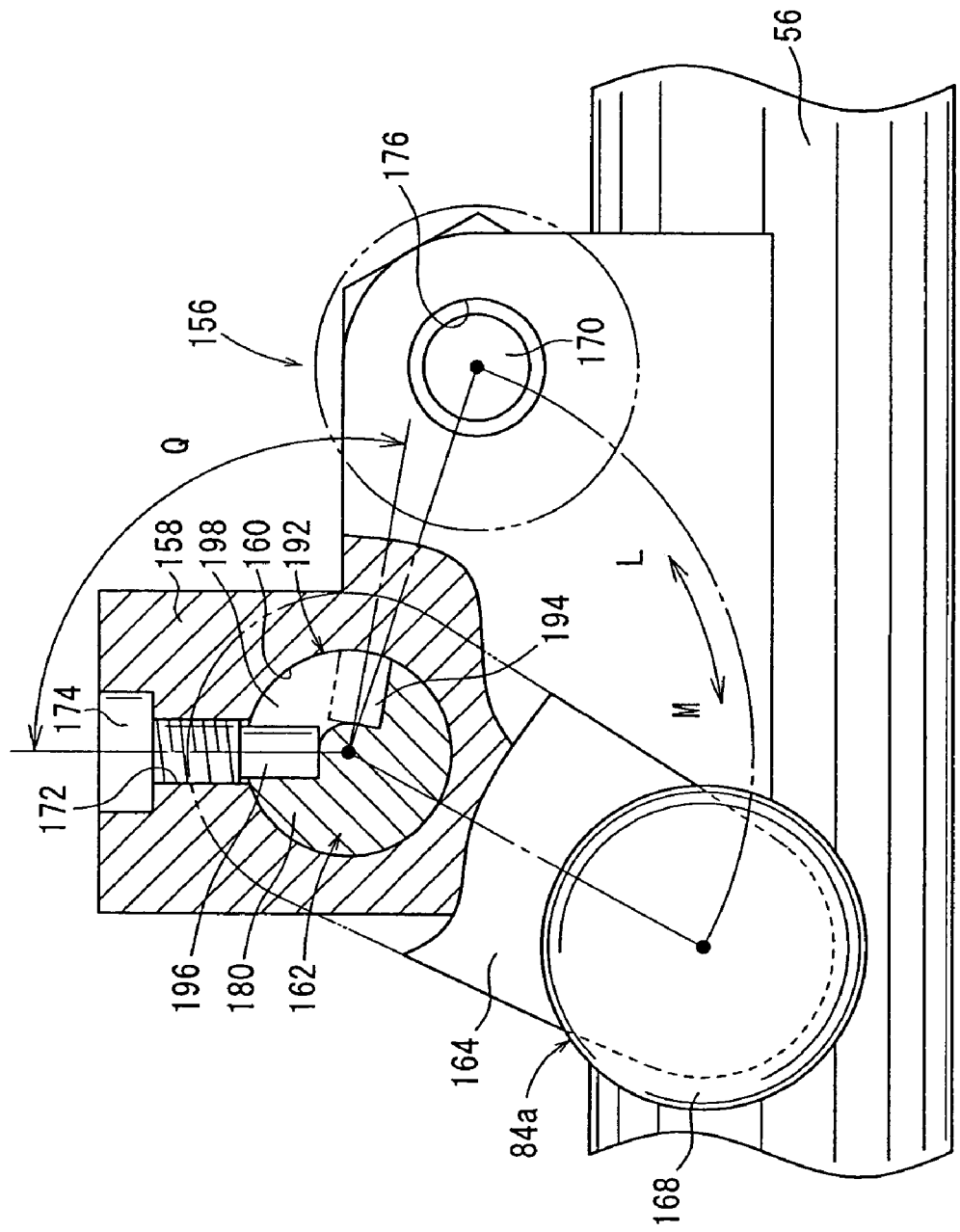
FIG. 15 is a partial cross-sectional front view as viewed from a direction indicated by an arrow T in FIG. 12, showing the side of the resilient member of the switching mechanism.

The insertion hole 160 (refer to FIG. 14) is formed so as to pass through the body 158 substantially parallel with the subframe 54a, and as shown in FIG. 15, a pin hole 172 is formed from the upper surface of the body 158 so as to intersect in a substantially orthogonal manner and is inserted through the insertion hole 160. An engaging pin (engaging member) 174 is screwed into the pin hole 172 from above the body 158, and is provided in such a manner that the end of the engaging pin 174 projects a prescribed length into the insertion hole 160. Free displacement along the axial direction is possible by screwing the engaging pin 174.

Further, a screw hole 176 is formed to pass through the body 158 at a prescribed distance from the insertion hole 160, and a long stopper bolt 170 (refer to FIG. 14) is screwed in so as to be freely displaceable along the axial direction under the screwing operation at the screw hole 176.

Figure 13:
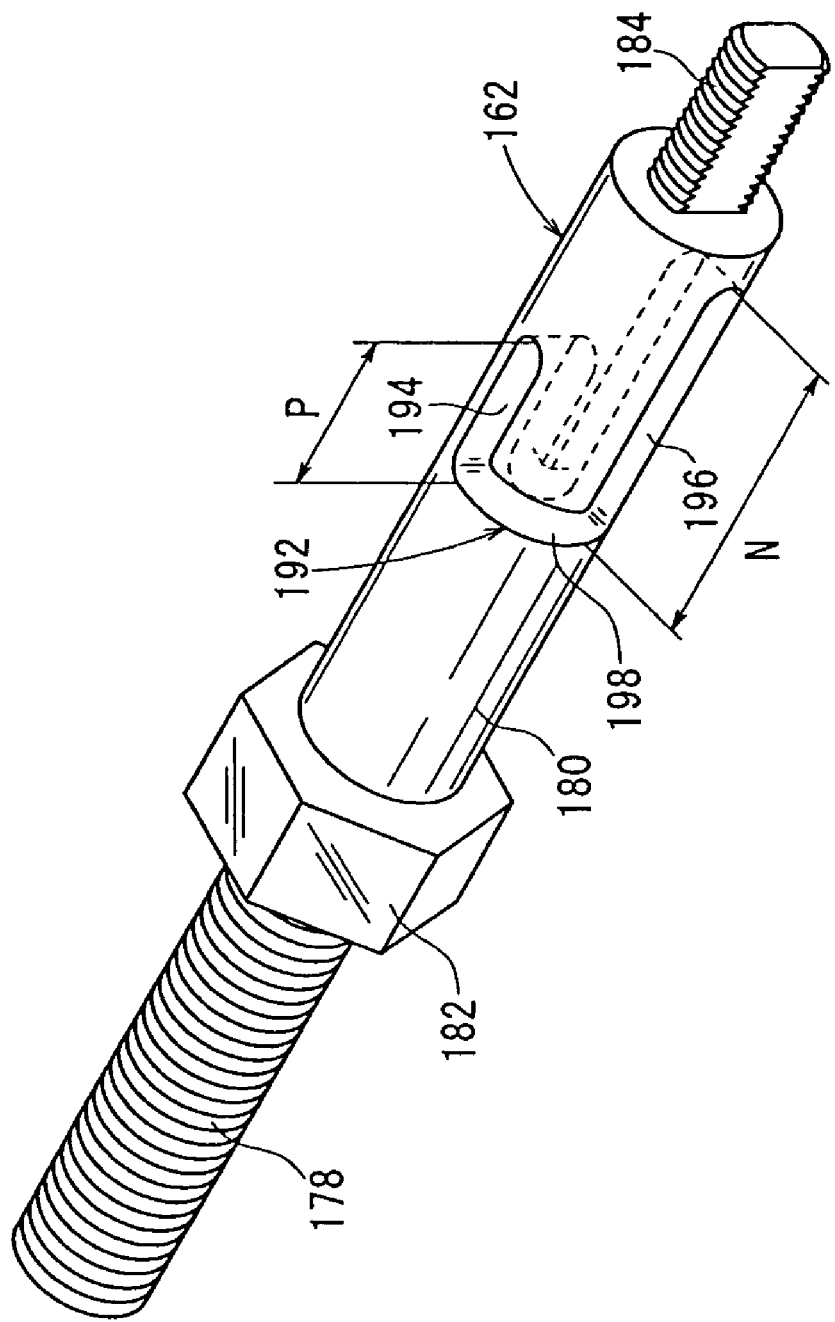
FIG. 13 is a perspective view of an adjustment pin of the switching mechanism of FIG. 12.

As shown in FIG. 13, the adjustment pin 162 comprises a first threaded part 178 which is threaded at the outer surface at one end, a shaft 180 inserted through the insertion hole 160 of the body 158 (refer to FIG. 14), a nut 182 substantially hexagonal in cross-section provided between the shaft 180 and the first threaded part 178, and a second threaded part 184 formed at the other end with the outside surface thereof being threaded. The cross-section of the second threaded part 184 is formed in a plane so that the outer peripheral surface thereof is substantially symmetrical taking the shaft center of the second threaded part 184 as center. Namely, the second threaded part 184 is substantially ellipsoidal in cross-section.

Figure 16:
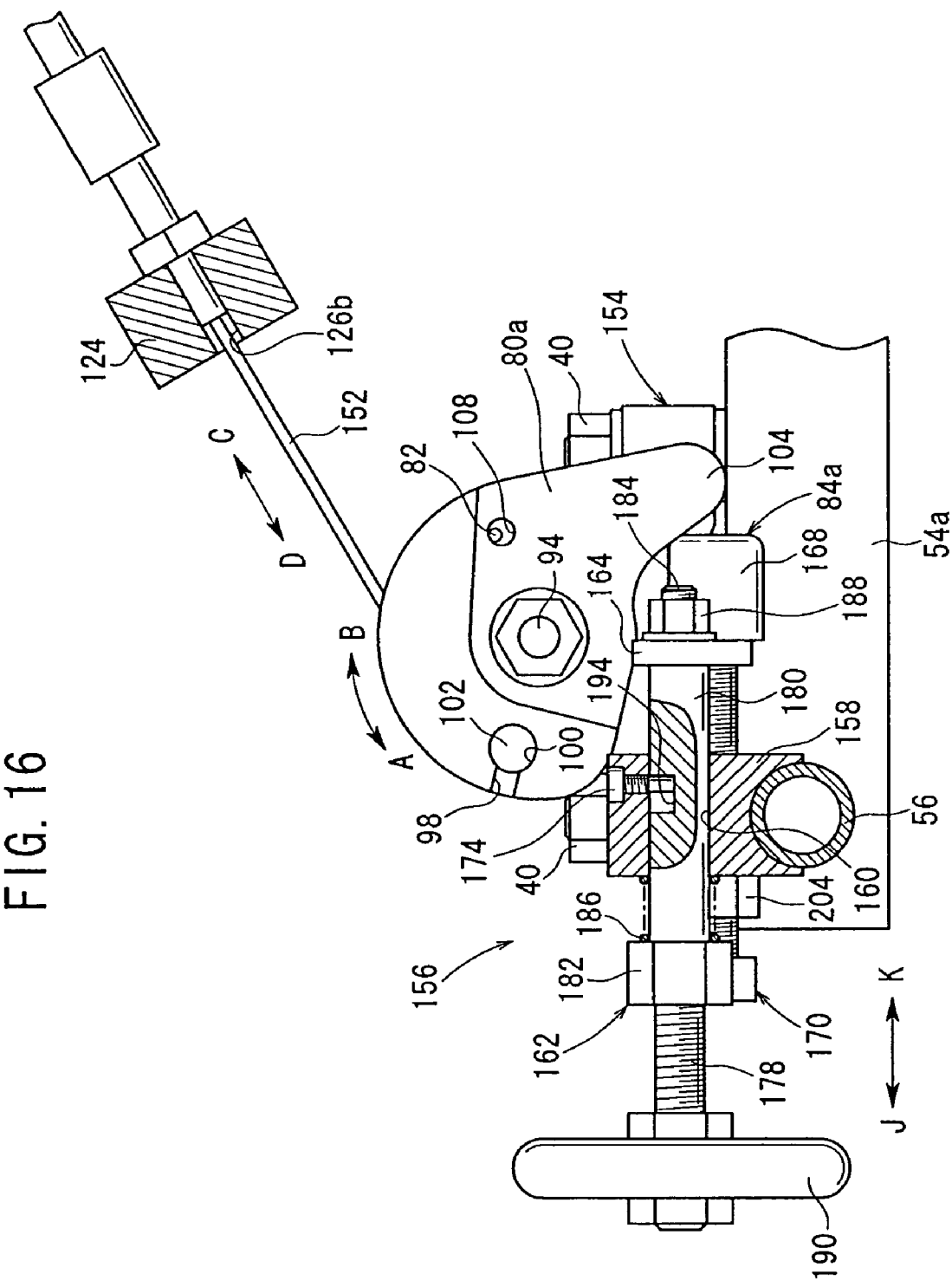
FIG. 16 is a partial cross-sectional side view as viewed from a direction indicated by an arrow U in FIG. 12, showing the vicinity of the switching mechanism.
Figure 17:
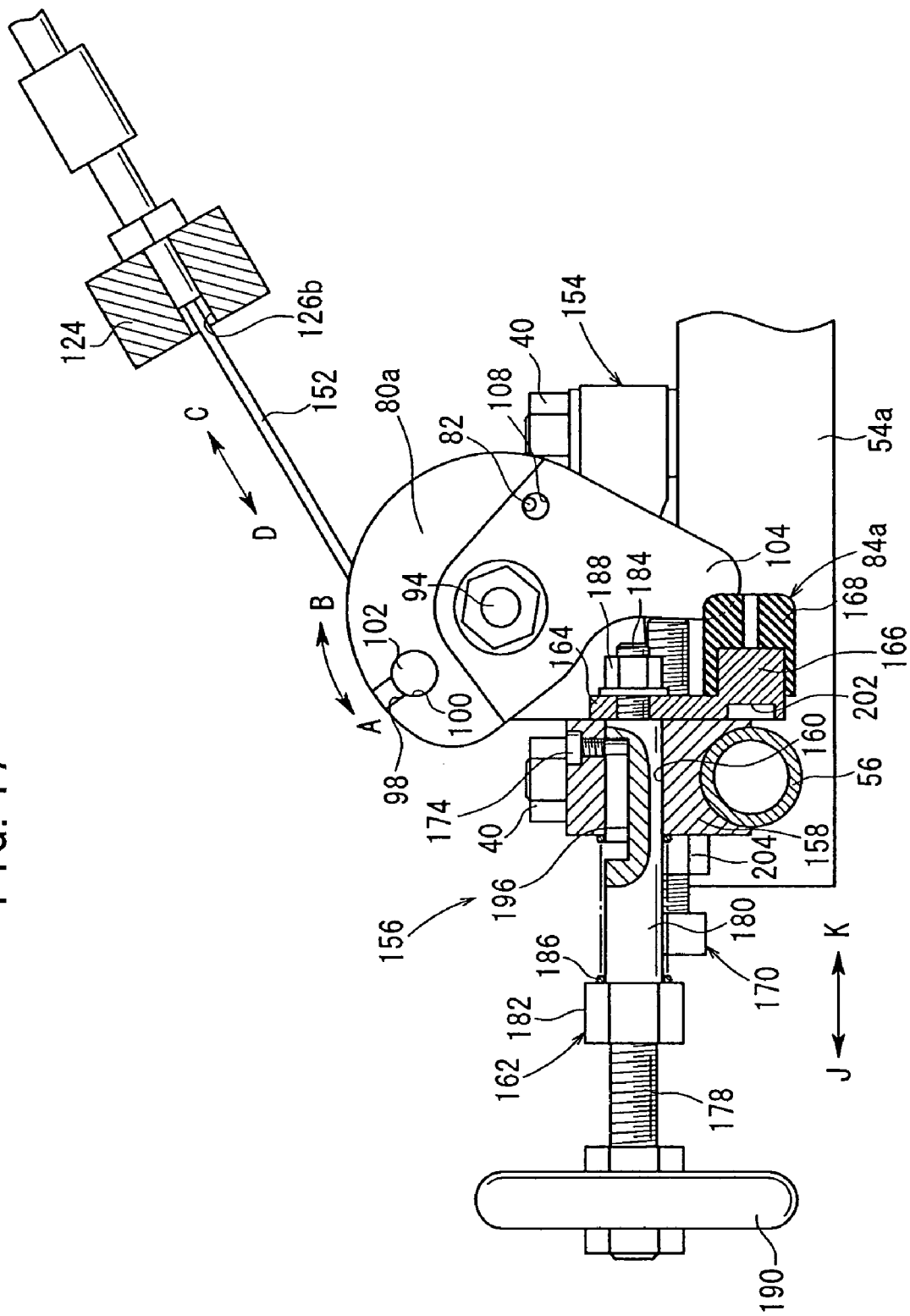
FIG. 17 is a partial cross-sectional side view showing where a resilient member of the plate member is displaced to the lower side of the adjustment pin under the switching action of the switching mechanism, and a state where the stopper bolt is facing a position opposite to the first rotating pulley, assuming a motorcycle with a manual transmission.

As shown in FIG. 16 and FIG. 17, this adjustment pin 162 is inserted into the insertion hole 160 so as to be on the side of the projection 104 of the first rotating pulley 80a, and a spring 186 (for example, a coil spring) is arranged at the shaft 180 inserted into the insertion hole 160. The spring 186 is interposed between the body 158 and the nut 182 of the adjustment pin 162, and the spring force of the spring 186 urges the adjustment pin 162 in a direction away from the body 158 (in the direction of arrow J).

Next, the adjustment pin 162 is mounted on the body 158 and the plate member 164 is fixed to the adjustment pin 162 by inserting the plate member 164 through the second threaded part 184 of the adjustment pin 162 inserted through the insertion hole 160 of the body 158 and screwing a nut 188 onto the end of the second threaded part 184.

Further, by then screwing a disk-like switching handle 190 at the end of the first threaded part 178 and with the operator 140 (refer to FIG. 3) then gripping and rotating the switching handle 190, it is possible to rotate the adjustment pin 162 integrally coupled to the switching handle 190 with respect to the body 158 (in the direction of arrows M or L in FIG. 12 and FIG. 15).

On the other hand, at the outer peripheral surface of the shaft 180, as shown in FIG. 13, a substantially U-shaped engaging channel 192 is formed to a prescribed depth. The engaging channel 192 is comprised of a first engaging channel (first channel) 194 extending a prescribed length along the direction of the second threaded part 184 from substantially a central part along the axial direction of the shaft 180, a second engaging channel (second channel) 196 provided spaced by a prescribed angle (Q in FIG. 15) along the first engaging channel 194 and the peripheral surface of the shaft 180, and a coupling channel (third channel) 198 formed in an annular shape at the peripheral surface of the shaft 180 so as to link with other ends of the nut 182 at the first and second stopping channels 194 and 196. The first and second stopping channels 194 and 196 are formed so as to extend towards the direction of the second threaded part 184.

A length N along the axial direction of the second engaging channel 196 is formed so as to be longer than a length P along the axial direction of the first engaging channel 194.

As shown in FIG. 16 and FIG. 17, the end of the engaging pin 174 screwed in at the pin hole 172 during insertion through the insertion hole 160 of the body 158 is screwed in at the engaging channel 192 comprised of the first engaging channel 194, second engaging channel 196 and a coupling channel 198. Namely, because this engaging pin 174 is fixed to the body 58, it is in a state where displacement in the axial direction (the direction of arrows J and K) and in the direction of rotation (the direction of arrows M and L in FIG. 15) is restricted via the engaging channel 192 where the adjustment pin 162 is engaged with the engaging pin 174.

Specifically, displacement along the direction of rotation of the adjustment pin 162 is restricted to within a range of rotation angles (Q in FIG. 15) via the coupling channel 198 in a state of engagement with the engaging pin 174, and displacement along the axial direction of the adjustment pin 162 is restricted to within a range of a length (N, P in FIG. 13) along the respective axial directions in a state where the engaging pin 174 engages with the first engaging channel 194 and second engaging channel 196.

As shown in FIG. 15, the plate member 164 is formed with a substantially ellipsoidal cross-section, with an engaging hole 200 (refer to FIG. 14) that the second threaded part 184 of the adjustment pin 162 engages with being formed at one end, and a projection 166 (refer to FIG. 14) projecting by just a prescribed length at the side of the first rotating pulley 80a being formed at the other end spaced a prescribed distance from the engaging hole 200. A resilient member 168 of a substantially ellipsoidal shape comprised of a resilient material (for example, rubber) is fitted at the projection 166.

The shape of the engaging hole 200 corresponds to the cross-sectional shape of the second threaded part 184 (refer to FIG. 13) formed so as to be flat in parts. Because of this, the adjustment pin 162 and the plate member 164 engage in such a manner that movement in the rotation direction is restricted as a result of passing through the second threaded part 184 of the adjustment pin 162 so as to engage with the engaging hole 200, so that the plate member 164 then rotates in an integrated manner when the adjustment pin 162 is made to rotate. In other words, relative rotation of the plate member 164 when the adjustment pin 162 is made to rotate is prevented.

Further, as shown in FIG. 14, at the other end of the plate member 164, a recess 202 is formed to a prescribed depth so that a side surface on the opposite to the side surface where the projection 166 is formed faces towards the side of the projection 166.

As shown in FIG. 15, in the case where the plate member 164 rotates in the direction of arrow L taking the adjustment pin 162 inserted through the body 158 as a fulcrum and the first engaging channel 194 of the adjustment pin 162 engages with the engaging pin 174 provided at the body 158, the position of the projection 166 and resilient member 168 of the plate member 164 and the position of the screw hole 176 of the body 158 is substantially in a straight line (the two-dotted and dashed line in FIG. 15). In other words, the recess 202 formed at the plate member 164 and the screw hole 176 of the body 158 are positioned facing each other (refer to FIG. 14). The stopper bolt 170 screwed into the screw hole 176 is positioned in a rotational orbit of the recess 202 of the plate member 164 (refer to FIG. 15)

On the other hand, in the case where the plate member 164 rotates taking the adjustment pin 162 as a fulcrum so that the second engaging channel 196 of the adjustment pin 162 engages with the engaging pin 174, the other end of the plate member 164 at which the resilient member 168 is mounted rotates in the direction of arrow M, and the resilient member 168 projecting at the plate member 164 takes on a state of being positioned below the adjustment pin 162 (the solid line position in FIG. 15). In other words, the stopper bolt 170 screwed into the screw hole 176 of the body 158 is put into a state opposite the first rotating pulley 80a (refer to FIG. 12) as a result of the plate member 164 being rotatably displaced from a position facing the screw hole 176 of the body 158.

Namely, the rotation angle (extent of rotation) of the adjustment pin 162 and the plate member 164 is set as a distance angle Q for between the first engaging channel 194 formed at the shaft 180 of the adjustment pin 162 and the second engaging channel 196.

Further, as shown in FIG. 14, the adjustment pin 162 is always pushed in a direction (direction of arrow J) away from the body 158 as a result of the spring force of the spring 186 interposed between the nut 182 at the adjustment pin 162 and the body 158.

Because of this, as shown in FIG. 16, when the engaging pin 74 engages with the first engaging channel 194 under the rotation action of the adjustment pin 162, the adjustment pin 162 is displaced in a direction of arrow J away from the body 158 by just a length P (refer to FIG. 13) along the axial direction of the first engaging channel 194 due to the spring force of the spring 186 under the engaging action of the engaging pin 174 and the first engaging channel 194.

On the other hand, as shown in FIG. 17, when the engaging pin 174 engages with the second engaging channel 196 under the rotation action of the adjustment pin 162, the adjustment pin 162 is displaced in a direction of arrow J away from the body 158 by just a length N (refer to FIG. 13) along the axial direction of the second engaging channel 196 due to the spring force of the spring 186 under the engaging action of the engaging pin 174 and the second engaging channel 196.

During this time, at the first engaging channel 194 and the second engaging channel 196, as shown in FIG. 13, the length is different along the axial direction, and displacement along the axial direction of the adjustment pin 162 is therefore also different. Namely, the length N for the second engaging channel 196 is longer than the length P of the first engaging channel 194 (N>P). The amount of displacement of the adjustment pin 162 when the engaging pin 174 is engaged with the second engaging channel 196 is therefore larger than the amount of displacement while the engaging pin 174 is engaged with the first engaging channel 194.

As shown in FIG. 14, the stopper bolt 170 is screwed into the screw hole 176 (refer to FIG. 15) of the body 158 with the stopper nut 204 screwed in. Then, after deciding upon a desired position by moving the along the axial direction with respect to the body 158 by screwing the stopper bolt 170, the stopper nut 204 screwed between the head of the stopper bolt 170 and the body 158 is screwed in so as to make contact with the side surface of the body 158. As a result, further displacement in the axial direction of the stopper bolt 170 is restricted by the stopper nut 204, and loosening or detachment of the stopper bolt 170 can be prevented.

Further, as shown in FIG. 14, when the plate member 164 rotates so that the first engaging channel 194 of the adjustment pin 162 engages with the engaging pin 174 so that the recess 202 of the plate member 164 is positioned facing the screw hole 176, the tip of the stopper bolt 170 is inserted into the recess 202. The internal circumference of the recess 202 is substantially the same or slightly larger than the diameter of the tip of the stopper bolt 170.

Namely, as a result of inserting the tip of the stopper bolt 170 in the recess 202 of the plate member 164, it is possible to suppress deformation while the plate member 164 is pushed to the side of the stopper bolt 170 by the first rotating pulley 80a via the resilient member 168 provided at the projection 166 (refer to FIG. 16).

In the above description, the plate member 164 and the stopper bolt 170 are provided next to each other. However, the present invention is by no means limited in this respect. When the stopper bolt 170 is not provided, the operator 140 grips the operating lever to ensure that the steering handle 28 and the operating lever come into contact to ensure latching.

Next, a description is given of the operation and operation results of the riding simulation device 150 having the switching mechanism 156 described above.

First, at the riding simulation device 150, when simulation is carried out assuming the case of a motorcycle with an automatic transmission, the adjustment pin 162 at the switching mechanism 156 rotates so that the first engaging channel 194 engages with the engaging pin 174, and the resilient member 168 of the plate member 164 adopts a position facing the first rotating pulley 80a as an initial state.

First, assuming a motorcycle with an automatic transmission, as shown in FIG. 3, a description is given for the case where an operator 140 grips an operation lever (not shown)

functioning as a brake lever provided at the side of the left grip 36a so as to reduce speed of a motorcycle displayed on the display 128. As shown in FIG. 1, the case where speed of a motorcycle displayed on the display 128 is reduced by gripping the brake lever 32 provided on the side of the right grip 36b at the steering handle 28 is the same as for the riding simulation device 10 of the first embodiment, and description thereof is omitted.

From the initial state described above, in order for the motorcycle to reduce speed, the operator 140 (refer to FIG. 3) grips and rotates an operation lever (not shown) of the handle mechanism 12 (refer to FIG. 1) over by a prescribed amount to the side of the steering handle 28 (refer to FIG. 1), so that a wire 152 (refer to FIG. 16) linked to the operation lever is tensioned under the rotating action of the operation lever.

As shown in FIG. 16, the wire 152 tensioned by the operation lever is tensioned in the direction of arrow C via a channel 126b of the cable holder 124. The first rotating pulley 80a linked to the wire 152 via the wire latch member 102 is then rotated in a direction towards the rear of the simulation device 150 (direction of arrow B) integrally with the shaft 94 supported at the detecting body 78a (refer to FIG. 12) against the spring force of the first return spring 82.

The projection 104 is rotated in a direction (the direction of arrow B) towards the resilient member 168 installed at the plate member 164, and the projection 104 of the first rotating pulley 80a comes into contact with the end surface of the resilient member 168.

Further, the contacting surface of the projection 104 of the first rotating pulley 80a presses the resilient member 168 of the switching mechanism 156 towards the projection 166 (refer to FIG. 14) as a result of the operator 140 (refer to FIG. 3) increasing operating force of the operation lever, and the projection 104 presses and deforms the resilient member 168 while rotating.

Finally, the first rotating pulley 80a rotates up to a position where the resilient member 168 pressed by the projection 104 no longer deforms so that the rotation operation is stopped. Namely, the plate member 164 is attached to the resilient member 168, and the resilient member 168 and the plate member 164 function as the first stopper 84a for limiting the rotation of the first rotating pulley 80a.

In this way, in the case of simulation assuming a motorcycle with an automatic transmission, the adjustment pin 162 and the plate member 164 are rotated in an anti-clockwise direction (the direction of arrow L in FIG. 15) via the switching handle 190, and the resilient member 168 fitted to the plate member 164 is moved to a position facing the first rotating pulley 80a. Because of this, after the first rotating pulley 80a is rotated through a prescribed angle under the tensioning operation of the wire 152 coupled to the operation lever as a result of the operator 140 gripping the operation lever (not shown) provided at the left grip 36a of the handle mechanism 12, the projection 104 of the first rotating pulley 80a makes contact with the resilient member 168 so as to press the resilient member while rotating (refer to FIG. 16).

As a result, as with the riding simulation device 10 according to the first embodiment, by changing reaction force applied to the operation lever after the projection 104 of the first rotating pulley 80a comes into contact with the resilient member 168, it is possible to simulate a feeling when braking that is much similar to the operation feeling of reducing speed as a result of gripping the brake lever of an actual motorcycle provided with an automatic transmission, and a simulated experience that is much closer to that of the brake operation feeling of an actual motorcycle can be obtained.

Next, a description is given of the case performed by the riding simulation device 150 of switching over from a brake operation feeling obtained via an operation lever while carrying out simulation assuming a motorcycle with an automatic transmission to a clutch operation feeling obtained using an operation lever of a motorcycle with a manual transmission using the switching mechanism 56 in the case of carrying out simulation assuming the case of a motorcycle fitted with a manual transmission. The clutch operation feeling herein means feeling of the operator 140 in the following operation. The operator 140 grips the operation lever to apply a substantially constant operation force to the operation lever. When the operation force reaches a predetermined level, the displacement of the operation lever stops.

First, when the operator 140 (refer to FIG. 3) is not gripping the operation lever (not shown), the operator 140 grips the switching handle 190 of the switching mechanism 156 and applies pressure towards the side of the first rotating pulley 80a (the direction of arrow K in FIG. 17). During this time, the first engaging channel 194 at the adjustment pin 162 is in an engaging state (refer to FIG. 14 and FIG. 16) at the engaging pin 174 fixed to the body 158.

The adjustment pin 162 linked to the switching handle 190 is then moved to the side of the first rotating pulley 80a (the direction of arrow K) against the spring force of the spring 186, and the adjustment pin 162 is displaced along the first engaging channel 194 engaging with the engaging pin 174. Further movement along the axial direction of the adjustment pin 162 is therefore restricted as a result of the second engaging pin 174 making contact with the wall surface of the coupling channel 198, coupling with the first engaging channel 194.

The plate member 164 through which the end of the stopper bolt 170 is inserted via the recess 202 is such that the recess is spaced away from the end of the stopper bolt 170 as a result of the adjustment pin 162 being displaced in the direction of arrow K. As a result, the rotation and displacement control state of the plate member 164 restricted by the engaging of the end of the stopper bolt 170 and the recess 202 is released.

Next, as shown in FIG. 12, the adjustment pin 162 and the plate member 164 rotate in a clockwise direction (in the direction of arrow M in FIG. 15) with the engaging pin 174 in a state of engagement at the coupling channel 198 of the adjustment pin 162 as a result of the switching handle 190 being made to rotate in a clockwise direction (in the direction of arrow M).

Then, as shown in FIG. 17, after the engaging pin 174 comes into contact with the wall surface of the second engaging channel 196 under the rotating action of the adjustment pin 162, the switching handle 190 and adjustment pin 162 are moved in a spaced direction (the direction of arrow J) from the body 158 by the spring force of the spring 186 as a result of the operator 140 (refer to FIG. 3) releasing pressure urging the switching handle 190 to the side of the body 158 (the direction of arrow K).

During this time, the adjustment pin 162 is engaged with the engaging pin 174 via the second engaging channel 196. The adjustment pin 162 is therefore displaced along the axial direction by just the length N (refer to FIG. 13) of the second engaging channel 196, and the end of the second engaging channel 196 is latched in an engaged state.

As a result, as shown in FIG. 15, the adjustment pin 162 is rotated through just a prescribed angle Q in a clockwise direction (in the direction of arrow M) integrally with the plate member 164, and the resilient member 168 of the plate member 164 is positioned below the adjustment pin 162.

Further, in the case where the engaging pin 174 is engaged with the second engaging channel 196, at the engaging channel 192 of the adjustment pin 162, the length N (refer to FIG. 13) of the second engaging channel 196 is longer along the axial direction than the length P (refer to FIG. 13) of the first engaging channel 194 (N>P). Therefore, compared to the case where the engaging pin 174 engages with the end of the first engaging channel 194, so that the resilient member 168 of the plate member 164 and the stopper bolt 170 are substantially along a straight line, the displacement along the direction of arrow J of the adjustment pin 162 is large by just the difference (|N−P|) of the lengths of the first engaging channel 194 and the second engaging channel 196. Namely, the adjustment pin 162 and the plate member 164 are such that there is a large space provided from the first rotating pulley 80a compared with the case where the resilient member 168 faces the first rotating pulley 80a.

Then, as a result of the resilient member 168 of the plate member 164 being displaced from a position (two-dotted chain line position in FIG. 15) facing the first rotating pulley 80a to a position below the adjustment pin 162 (the solid line position in FIG. 15) via the switching mechanism 156, the stopper bolt 170 adopts a position facing the first rotating pulley 80a, i.e. a state where a clutch operation feeling similar to that of a motorcycle with a manual transmission is switched over to (refer to FIG. 17). A description is now given of where, at the riding simulation device 150 where switching takes place via the switching mechanism 156 so that stopper bolt 170 is opposite in a position facing the first rotating pulley 80a, the operator 140 grips an operation lever functioning as a clutch lever by a prescribed amount so that the motorcycle displayed on the display 128 is made to undergo a speed change operation.

With the speed change operation in the aforementioned motorcycle, the operator 140 (refer to FIG. 3) grips and rotates the operation lever (not shown in the drawings) of the handle mechanism 12 (refer to FIG. 1) a prescribed amount to the side of the steering handle 28 (refer to FIG. 1) so that the wire 152 coupled to the operation lever is tensioned under the rotating operation of the operation lever.

Next, as shown in FIG. 17, the first rotating pulley 80a linked to the wire 152 tensioned by the operation lever is rotated in a direction towards the rear (the direction of arrow B) of the simulation device 150 together with the shaft 94 under the resistance of spring force of the first return spring 82.

Next, the projection 104 is rotated through a prescribed angle in a direction (the direction of arrow B) towards the stopper bolt 170 and the projection 104 of the first rotating pulley 80a comes into contact with the end surface of the stopper bolt 170 so as to be stopped (refer to FIG. 17). After the speed change operation of the motorcycle is complete, the operator 140 releases grip on the operation lever, so that the first rotating pulley 80a is rotated by the spring force of the first return spring 82, and the operation lever returns to a state of being away from the left grip 36a (refer to FIG. 1).

In this way, in the case of carrying out simulation assuming a motorcycle with a manual transmission, as a result of causing the adjustment pin 162 and the plate member 164 to rotate in a clockwise direction (the direction of arrow M) via the switching handle 190, the resilient member 168 fitted at the plate member 164 is rotatably displaced so as to be positioned below the adjustment pin 162 from a position facing the first rotating pulley 80a, so that switching takes place in such a manner that the first rotating pulley 80a and the stopper bolt 170 of the switching mechanism 156 are positioned facing each other (refer to FIG. 12).

As a result, when the operator 140 (refer to FIG. 3) grips the operation lever, the first rotating pulley 80a is caused to rotate via the wire 152, and a substantially fixed reaction force is applied to the operation lever until the projection 104 of the first rotating pulley 80a makes contact with the end surface of the stopper bolt 170. Because of this, an operation feeling similar to the feeling of an operation while changing speed by gripping a clutch lever of an actual motorcycle with a manual transmission is obtained, and a simulated experience can be realized with a clutch operation feeling that is much closer to the feeling of an actual motorcycle.

As a result of the resilient member 168 mounted on the plate member 164 being rotatably displaced to a position facing the first rotating pulley 80a by the switching mechanism 156, again it is possible to perform switching over to obtain an operation feeling similar to the brake operation feeling of an actual motorcycle with an automatic transmission.

In the second embodiment of the present invention described above, by using the switching mechanism 156 provided at the upper part of the cross-frame 56 in the case of simulation assuming a motorcycle with an automatic transmission, the resilient member 168 fitted to the plate member 164 is displaced to a position opposite the first rotating pulley 80a under the rotating action of the adjustment pin 162, and as a result of the first rotating pulley 80a and the resilient member 168 coming into contact under the rotating action of the first rotating pulley 80a, it is possible to obtain a brake operation feeling close to that of an actual motorcycle.

On the other hand, it is also possible to obtain a clutch operation feeling close to that of an actual motorcycle as a result of, in the case of simulation assuming a motorcycle fitted with a manual transmission, the plate member 164 fitted to the resilient member 168 being rotatably displaced under the rotating operation of the adjustment pin 162 and making the stopper bolt 170 of the switching mechanism 156 and the first rotating pulley 80a face each other, and due to the first rotating pulley 80a and the stopper bolt 170 coming into contact under the rotating operation of the first rotating pulley 80a.

It is therefore possible to switch over between the brake operation feeling given by a motorcycle with an automatic transmission using an operation lever and a clutch operation feeling for a motorcycle with a manual transmission by having the adjustment pin 162 and the plate member 164 rotate via the switching handle 190 coupled to the end of the adjustment pin 162.

It is therefore possible to experience a clutch operation feeling when carrying out a speed change operation on a motorcycle with a manual transmission and a brake operation feeling when carrying out a speed reducing operation for a motorcycle with an automatic transmission as simulated experiences using a single riding simulation device 150.

Although there have been disclosed what are the present embodiments of the invention, it will be understood that variations and modifications may be made thereto without departing from the spirit of scope of the invention as indicated by the appended claims.

The invention claimed is:

1. A riding simulation device for displaying a traveling background as an image on a display so as to give a simulated experience of riding on a motorcycle based on operations by an operator comprising:
a display which displays a traveling background as an image;
a handle mechanism grasped and operated by the operator;
a brake lever provided at the handle mechanism for causing the motorcycle to decelerate as a result of grasping by the operator; and
a reaction force adjusting mechanism for adjusting a rate of change of a reaction force exerted in opposition to a force applied to the brake lever when the operator grasps the brake lever to decelerate the motorcycle.

2. A riding simulation device according to claim 1, further comprising:
a rotating member connected to the brake lever such that the rotating member rotates based on operation of the brake lever; and
a stopper mechanism for limiting rotation of the rotating member,
wherein the reaction force adjusting mechanism is provided at a contact part between the rotating member and the stopper mechanism;
and the reaction force adjusting mechanism includes a resilient member which is deformed under pressure when the rotating member contacts the resilient member.

3. A riding simulation device according to claim 2, wherein the rotating member is pulled by a wire connected to the brake lever, and rotates by a predetermined angle;
and the rotating member includes a spring for generating elastic force exerted in a direction opposite to a direction in which the rotating member rotates by the wire.

4. A riding simulation device according to claim 1, wherein the handle mechanism is rotatable about a shaft and an axis of the shaft is inclined at an angle of 45.degree. to 65° towards said operator from a vertical plane.

5. A riding simulation device according to claim 4, wherein the axis of the shaft of the handle mechanism is inclined at an angle of 50° to 60° towards the operator from the vertical plane.

6. A riding simulation device for displaying a traveling background as an image on a display so as to give a simulated experience of riding on a motorcycle based on operations by an operator comprising:
a display which displays a traveling background as an image;
a handle mechanism grasped and operated by the operator;
an operation lever provided at the handle mechanism, the operation lever being grasped by said operator for shifting transmission of the motorcycle when transmission is shifted manually, and decelerating the motorcycle when transmission of the motorcycle is shifted automatically;
a rotating member connected to the brake lever such that the rotating member rotates based on operation of the operation lever;
a stopper mechanism including a first stopper member and a second stopper member for limiting rotation of the rotating member, the first stopper member limiting rotation of the rotating member using a resilient member provided at a contact part between the rotating member and the first stopper member when braking operation is performed by the operator, the second stopper member coming in contact with the rotating member for limiting rotation of the rotating member when transmission of the motorcycle is shifted manually; and
a switching mechanism for switching between the first stopper member and the second stopper member depending on whether transmission of the motorcycle is shifted automatically or manually.

7. A riding simulation device according to claim 6, wherein the switching mechanism includes a body and a rotation shaft rotatably supported in an insertion hole of the body, and connected to the first stopper member.

8. A riding simulation device according to claim 7, wherein a substantially U-shaped engaging channel is formed on an outer circumferential surface of the rotation shaft, and an engaging member attached to the body is constantly in engagement with the engaging channel.

9. A riding simulation device according to claim 8, the engaging channel including:
a first channel formed along an axis of the rotation shaft;
a second channel formed substantially in parallel to, and spaced at a predetermined distance from the first channel; and
a third channel formed in substantially perpendicular to the first and second channels for connecting an end of the first channel and an end of the second channel.

10. A riding simulation device according to claim 7, wherein a projection is formed on one side surface of the first stopper members the resilient member is attached to the projection and a recess is formed on the other opposite side surface of the first stopper member such that the projection and the recess are aligned coaxially; and
the second stopper member is positioned in a rotational orbit of the projection and the recess when the first stopper member rotates by rotation of the rotation shaft.

11. A riding simulation device according to claim 10, wherein the second stopper member is inserted in the recess of the first stopper member when the projection and the second stopper member are positioned coaxially by rotation of the first stopper member.

12. A riding simulation device according to claim 7, wherein the handle mechanism is rotatable about a shaft, and an axis of the shaft is inclined at an angle of 45° to 65° towards said operator from a vertical plane.

13. A riding simulation device according to claim 12, wherein the axis of the shaft of the handle mechanism is inclined at an angle of 50° to 60° towards the operator from the vertical plane.

14. A riding simulation device for displaying a traveling background as an image on a display so as to give a simulated experience of riding on a motorcycle based on operations by an operator comprising:
a display which displays a traveling background as an image;
a handle mechanism grasped and operated by the operator;
a first operation lever provided at the handle mechanism, for causing the motorcycle to decelerate as a result of grasping by the operator; and
a second operation lever provided at the handle mechanism, the second operation lever being grasped by said operator for shifting a transmission of the motorcycle when the transmission of the motorcycle is shifted manually, and decelerating the motorcycle when the transmission of the motorcycle is shifted automatically;

first and second rotating members connected respectively to the first and second operation levers such that the rotating members rotate based on operation of the first and second operation levers;

first and second stopper mechanisms for limiting rotation of the first and second rotating members, the second stopper mechanism including first and second stopper members;

a switching mechanism for switching between the first stopper member and the second stopper member depending on whether transmission of the motorcycle is shifted automatically or manually; and a reaction force adjusting mechanism for adjusting the rate of change of a reaction force exerted in opposition to a force applied to the first operation lever when the operator grasps the first operation lever, and adjusting the rate of change of a reaction force exerted in opposition to a force applied to the second operation lever, in carrying out automatic shifting of transmission of the motorcycle.

15. A riding simulation device according to claim 14, wherein the reaction force adjusting mechanism includes a first resilient member and a second resilient member;

the first resilient member is provided at a contact part between the first rotating member and the first stopper mechanism, and deformed under pressure when the first rotating member contacts the first resilient member; and the second resilient member is provided at a contact part between the second rotating member and the second stopper mechanism, and deformed under pressure when the second rotating member contacts the second resilient member.

16. A riding simulation device according to claim 14, wherein the first rotating members is pulled by a wire connected to the first operation lever, and rotates by a predetermined angle, and the second rotating members is pulled by a wire connected to the second operation lever, and rotates by a predetermined angle; and the first rotating member includes a spring for generating elastic force exerted in a direction opposite to a direction in which the first rotating member rotates, and the second rotating member includes a spring for generating elastic force exerted in a direction opposite to a direction in which the second rotating member rotates.

17. A riding simulation device according to claim 14, wherein the switching mechanism includes a body and a rotation shaft rotatably supported in an insertion hole of the body, and connected to the first stopper member.

18. A riding simulation device according to claim 17, wherein a projection is formed on one side surface of the first stopper member, the resilient member is attached to the projection, and a recess is formed on the other opposite side surface of the first stopper member such that the projection and the recess are aligned coaxially; and the second stopper member is positioned in a rotational orbit of the projection and the recess when the first stopper member rotates by rotation of the rotation shaft.

19. A riding simulation device according to claim 18, wherein the second stopper member is inserted in the recess of the first stopper member when the projection and the second stopper member are positioned coaxially by rotation of the first stopper member.

20. A riding simulation device according to claim 14, wherein the handle mechanism is rotatable about a shaft, and an axis of the shaft is inclined at an angle of 45° to 65° towards said operator from a vertical plane.

21. A riding simulation device according to claim 20, wherein the axis of the shaft of the handle mechanism is inclined at an angle of 50° to 60° towards the operator from the vertical plane.

* * * * *